(12) United States Patent
Watanabe

(10) Patent No.: US 12,105,898 B2
(45) Date of Patent: *Oct. 1, 2024

(54) ACTIVE CAPACITIVE STYLUS, SENSOR CONTROLLER, RELATED SYSTEM AND METHOD

(71) Applicant: Wacom Co., Ltd., Saitama (JP)

(72) Inventor: Naoki Watanabe, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,359

(22) Filed: May 10, 2023

(65) Prior Publication Data

US 2023/0280845 A1 Sep. 7, 2023

Related U.S. Application Data

(63) Continuation of application No. 17/828,365, filed on May 31, 2022, now Pat. No. 11,687,174, which is a
(Continued)

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/041* (2013.01);
(Continued)

(58) Field of Classification Search
CPC ............... G06F 3/044; G06F 3/03545; G06F 2203/04111–04112; G06F 3/0383; H05K 999/99
See application file for complete search history.

(56) References Cited

U.S. PATENT DOCUMENTS 9,329,708 B2 5/2016 Westhues
9,495,011 B1 11/2016 Lee et al.
(Continued)

FOREIGN PATENT DOCUMENTS

WO 2015/11159 A1 7/2015

OTHER PUBLICATIONS

Extended European Search Report, dated Jan. 4, 2018, for European Application No. 15884027.2-1972, 8 pages.
(Continued)

*Primary Examiner* — Stephen G Sherman
(74) *Attorney, Agent, or Firm* — Seed IP Law Group LLP

(57) ABSTRACT

A method may be executed by one or more active capacitive styluses and a sensor controller connected to sensor electrodes. The method includes: a discovery step, executed by the sensor controller, of repeatedly sending out a discovery packet for detecting any of the active capacitive styluses; a discovery response step, executed by a first active capacitive stylus among the one or more active capacitive styluses, by which the discovery packet is detected, of returning a response packet to the discovery packet; a configuration step, executed by the sensor controller, of transmitting a configuration packet including time slot designation information that designates a first time slot to the first active capacitive stylus; and a data transmission step, executed by the first active capacitive stylus, of transmitting operation state data indicative of an operation state of the first active capacitive stylus using the designated first time slot.

18 Claims, 14 Drawing Sheets

Related U.S. Application Data continuation of application No. 17/114,334, filed on Dec. 7, 2020, now Pat. No. 11,347,328, which is a continuation of application No. 16/672,805, filed on Nov. 4, 2019, now Pat. No. 10,860,119, which is a continuation of application No. 16/133,249, filed on Sep. 17, 2018, now Pat. No. 10,466,816, which is a continuation of application No. 15/595,692, filed on May 15, 2017, now Pat. No. 10,078,379, which is a continuation of application No. 15/347,935, filed on Nov. 10, 2016, now Pat. No. 9,652,058, which is a continuation of application No. 15/059,045, filed on Mar. 2, 2016, now Pat. No. 9,495,024.

(60) Provisional application No. 62/127,176, filed on Mar. 2, 2015, provisional application No. 62/140,934, filed on Mar. 31, 2015.

(51) Int. Cl.
*G06F 3/041* (2006.01)
*G06F 3/044* (2006.01)

(52) U.S. Cl.
CPC .......... *G06F 3/0412* (2013.01); *G06F 3/0414* (2013.01); *G06F 3/0416* (2013.01); *G06F 3/04162* (2019.05); *G06F 3/044* (2013.01); *G06F 3/0441* (2019.05); *G06F 3/0442* (2019.05); *G06F 3/0446* (2019.05); *G06F 2203/04101* (2013.01); *G06F 2203/04104* (2013.01); *G06F 2203/04105* (2013.01); *G06F 2203/04108* (2013.01)

(56) References Cited

U.S. PATENT DOCUMENTS

| | | |
|---|---|---|
| 9,495,024 B2 | 11/2016 | Watanabe |
| 9,652,058 B2 | 5/2017 | Watanabe |
| 10,078,379 B2 | 9/2018 | Watanabe |
| 10,466,816 B2 | 11/2019 | Watanabe |
| 11,687,174 B2 * | 6/2023 | Watanabe ............... G06F 3/044 345/179 |
| 2003/0214490 A1 | 11/2003 | Cool |
| 2006/0097955 A1 | 5/2006 | Kato |
| 2006/0262106 A1 | 11/2006 | Suk |
| 2008/0158165 A1 | 7/2008 | Geaghan et al. |
| 2008/0169132 A1 | 7/2008 | Ding et al. |
| 2012/0013555 A1 | 1/2012 | Maeda et al. |
| 2012/0068964 A1 * | 3/2012 | Wright ................. G06F 3/0442 345/174 |
| 2013/0106709 A1 | 5/2013 | Simmons |
| 2013/0106722 A1 | 5/2013 | Shahparnia et al. |
| 2013/0207926 A1 | 8/2013 | Kremin et al. |
| 2013/0207938 A1 | 8/2013 | Ryshtun et al. |
| 2014/0267184 A1 * | 9/2014 | Bathiche .............. G06F 1/3259 345/179 |
| 2015/0324029 A1 | 11/2015 | Bakken et al. |
| 2015/0363012 A1 | 12/2015 | Sundara-Rajan et al. |

OTHER PUBLICATIONS

Extended European Search Report, dated Jul. 27, 2021, for European Application No. 21168353.7-1216, 10 pages.

* cited by examiner

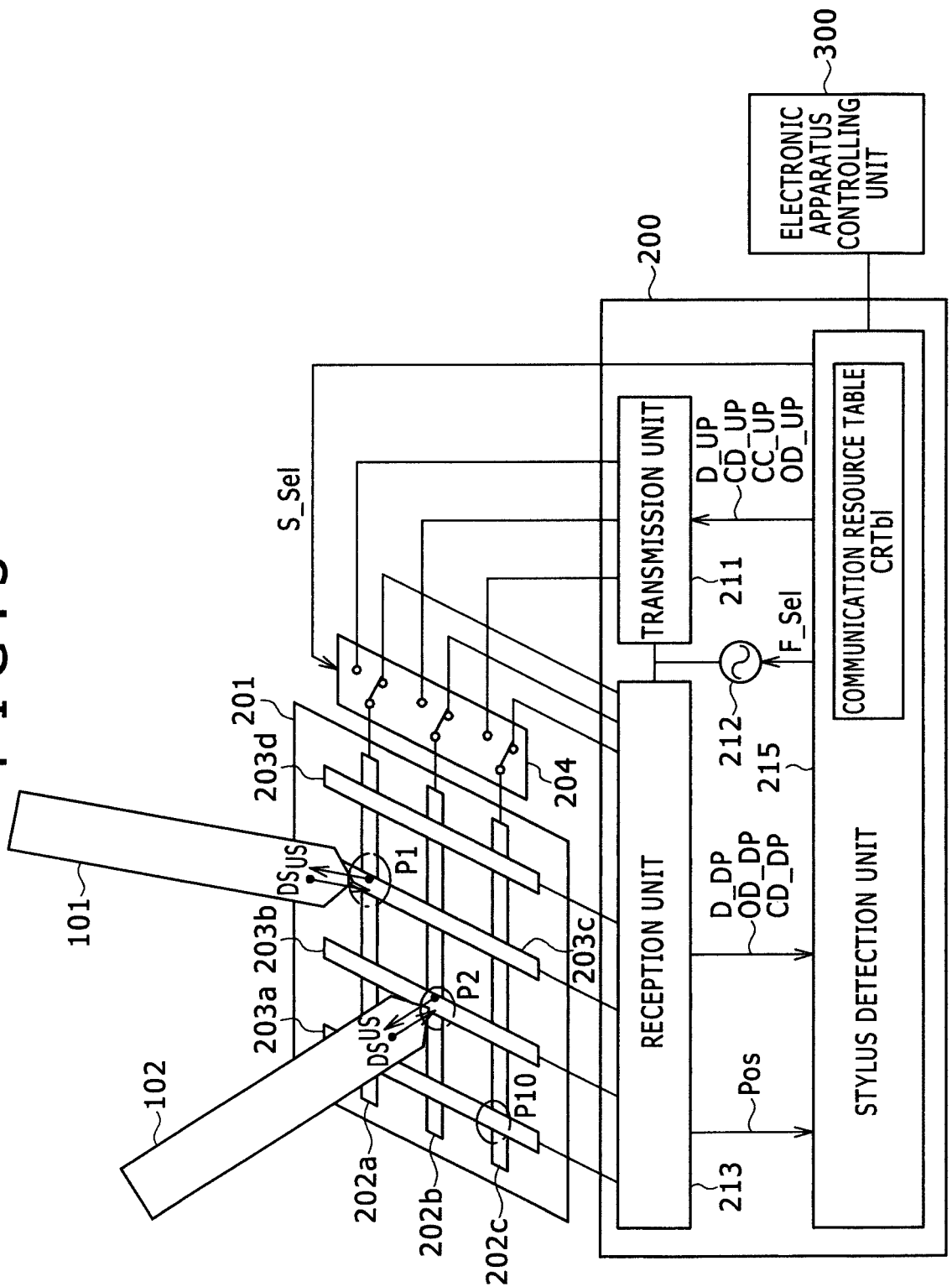

DISCOVERY MODE M1

SETTING MODE M2

STROKE MODE M3

HOLD MODE M4

SYNCHRONIZING DETECTION

DISCOVERY MODE M1

SETTING MODE M2

STROKE MODE M3
HOLD MODE M4

TIME SLOT s

FREQUENCY f

TIME SLOT s AND FREQUENCY f

TIME SLOT s AND FREQUENCY f

FIG. 8

| LID | COMMUNICATION CHANNEL | MODE | CONFIGURATION DATA CD(48+...) |
|---|---|---|---|
| 0b001 | 701 | M4 | SID #1 |
| 0b010 | 702 | M3 | SID #2 |
|  |  |  |  |

801 → (row 1)
802 → (row 2)

FIG.14A - Prior Art -
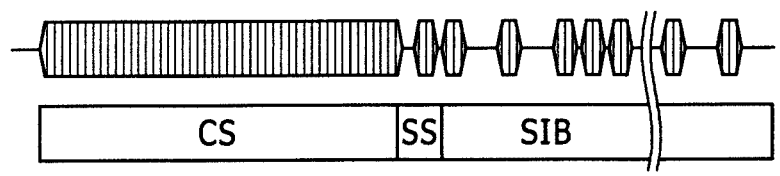
FIG.14B - Prior Art -
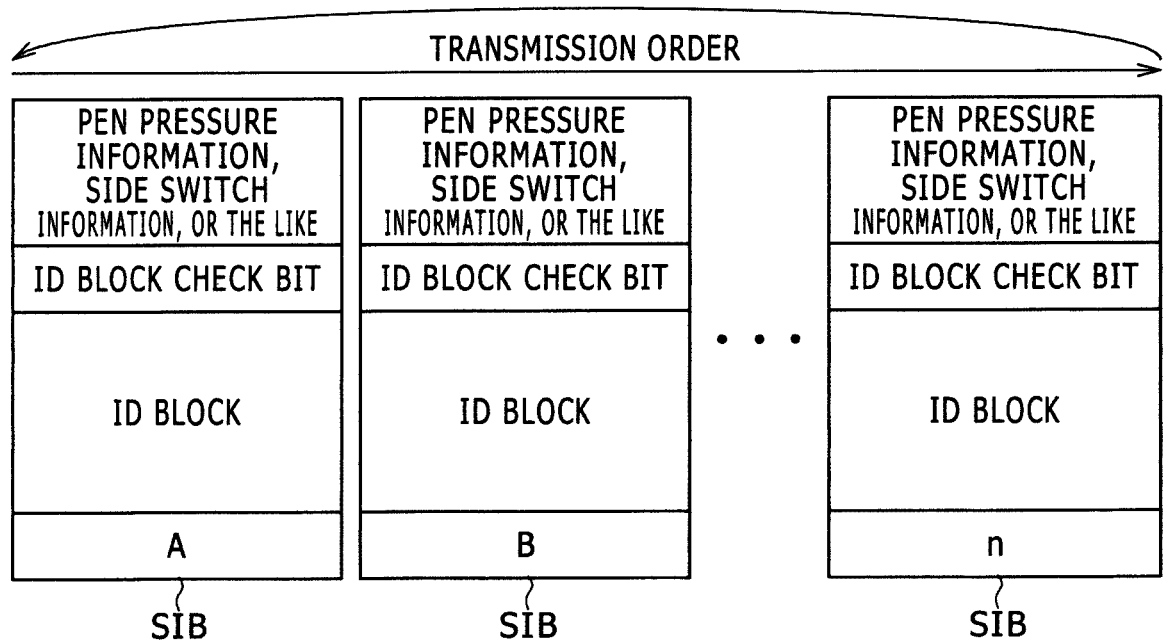

ACTIVE CAPACITIVE STYLUS, SENSOR CONTROLLER, RELATED SYSTEM AND METHOD

BACKGROUND

Technical Field

The present invention relates to an active capacitive stylus, a sensor controller, a system including an active capacitive stylus and a sensor controller, and a method executed by an active capacitive stylus, a sensor controller and a system. In particular, the present invention relates to an active capacitive stylus, a sensor controller and a system including them, which are suitable where one or more active capacitive styluses are operated to repeatedly move into and out of a detection range of sensor electrodes and methods executed by the active capacitive stylus, the sensor controller and the system.

Description of the Related Art

Styluses of various types having a pen shape have become available for use as an inputting device, for handwritten input on a panel of an electronic apparatus. A stylus called an active capacitive stylus includes an oscillation circuit, which sends out a frequency signal to cause an electrode provided near a tip end of the stylus to generate a variation of an electric field (alternating electric field) at a pointed position near the tip end of the stylus. A sensor provided in the electronic apparatus uses a group of electrodes disposed in a matrix form, to detect a variation of the charge amount induced in the electrode group by the variation of the electric field, to thereby detect a signal from the stylus. The position pointed by the stylus is derived based on the position of the electrode at which the signal is detected, the level of the detected signal, and so forth.

Among active capacitive styluses, some styluses can transmit information to a sensor controller by modulating a signal supplied from the oscillation circuit with information, such as pen pressure and a unique pen identification (ID).

An electronic pen disclosed in PCT Patent Publication No. WO2015/111159 (hereinafter, referred to as Patent Document 1) is an example of an active capacitive stylus of the type capable of transmitting information. The electronic pen successively transmits a continuous signal CS for position detection, and a signal block SIB including a first modulated signal obtained by modulating the continuous signal CS with partial information, which is obtained by dividing first information (a unique ID or the like associated with the electronic pen), to the position detection apparatus.

FIG. 14A depicts an example of a transmission signal including the continuous signal CS and the signal block SIB. FIG. 14B shows that the first information is transmitted by a plurality of signal blocks SIB. In FIG. 14B, a division number (block number A, B, ..., n) represents a number of an ID block corresponding to partial information. A microprocessor of a tablet in Patent Document 1 is configured to output position information, which is obtained from the continuous signal CS, and the first information in an associated relationship with each other.

Communication between an active capacitive stylus and a sensor controller is implemented by a local alternating electric field in the proximity (within approximately several millimeters to several tens of millimeters) of a pen tip electrode. Since communication that uses an electric field exhibits large attenuation in signal level depending on the distance, such communication is interrupted every time the stylus is moved away from the sensor of the electronic apparatus. Therefore, unlike wireless communications such as Bluetooth® communications, the stylus-sensor controller communication is not performed continuously.

Further, even if the stylus and the sensor have a proximate positional relationship with each other, the communication speed is rather limited.

Accordingly, it is desirable to minimize communication resources, such as time and frequency resources, needed for the stylus to communicate configuration data indicative of a stylus function or a stylus ID that do not vary depending on an operation state of the stylus to the sensor.

It would be desirable to provide technical support for: (1) a usage form, in which a user repeats a cycle of moving down a certain stylus, moving the stylus horizontally by a certain distance and then moving up the stylus, to thereby repeat the movement cycle into and out of a detection range of one sensor controller, and (2) another usage form, in which the user alternately uses a first stylus and a second stylus, while the first stylus and the second stylus are distinguishable from each other and while reducing the number of times data, which do not vary depending upon an operation state of the stylus (such as a stylus identifier), needs to be communicated from each stylus to the sensor.

BRIEF SUMMARY

According to a first aspect of the present invention, there is provided a method executed by one or more active capacitive styluses and a sensor controller connected to sensor electrodes. The method includes a discovery step, executed by the sensor controller, of repeatedly sending a discovery packet to detect any active capacitive stylus that may be present. The method further includes a discovery response step, executed by a first active capacitive stylus which has detected the discovery packet, from among the one or more active capacitive styluses, of returning a response packet. The method further includes a configuration step, executed by the sensor controller, of transmitting a configuration packet including time slot designation information that designates a first time slot to the first active capacitive stylus. The method also includes a data transmission step, executed by the first active capacitive stylus, of transmitting operation state data indicative of an operation state of the first active capacitive stylus using the first time slot designated by the configuration packet.

According to a second aspect of the present invention, the method includes a configuration information request step, executed by the sensor controller, of transmitting, to the first active capacitive stylus, a configuration information request packet that requests configuration information of the first active capacitive stylus, and a configuration response step, executed by the first active capacitive stylus, of transmitting the configuration information in response to receiving the configuration information request packet. The sensor controller transmits the configuration packet after receiving the configuration information from the first active capacitive stylus. The configuration information includes, for example, a first stylus identifier which is prestored in the first active capacitive stylus.

According to another aspect of the present invention, there is provided a system including one or more active capacitive styluses, and a sensor controller connected to sensor electrodes. The sensor controller repeatedly sends a discovery packet to detect any of the active capacitive styluses. The sensor controller transmits, to an active capacitive stylus among the one or more active capacitive styluses and from which a response packet to the discovery packet is received, a configuration packet including time slot designation information. The time slot designation information defines time slots, which use the discovery packet as a timing reference. Any of the one or more active capacitive styluses returns the response packet when the active capacitive stylus detects the discovery packet, and transmits operation state data indicative of an operation state of the active capacitive stylus using the time slots designated by the configuration packet.

According to a further aspect of the present invention, there is provided an active capacitive stylus for use with a system, which includes one or more active capacitive styluses and a sensor controller connected to sensor electrodes. The sensor controller repeatedly sends out a discovery packet to detect any of the active capacitive styluses and transmits, to an active capacitive stylus among the one or more active capacity styluses and from which a response packet to the discovery packet is received, a configuration packet including time slot designation information. The time slot designation information defines time slots, which use the discovery packet as a timing reference. The active capacitive stylus returns the response packet when the discovery packet is detected, and transmits operation state data indicative of an operation state of the active capacitive stylus using the time slots designated by the configuration packet, from among time slots defined by the reference timing.

According to a still further aspect of the present invention, there is provided a sensor controller for use with a system which includes one or more active capacitive styluses and the sensor controller connected to sensor electrodes. Any of the one or more active capacitive styluses is operable to return, when the active capacitive stylus detects a discovery packet for detecting the active capacitive stylus, a response packet, and to transmit operation state data indicative of an operation state of the active capacitive stylus using time slots designated by a configuration packet including time slot designation information for designating time slots, which use the discovery packet as a timing reference. The sensor controller repeatedly sends out the discovery packet and transmits the configuration packet to any of the one or more active capacitive styluses, from which the response packet to the discovery packet is returned.

According to the first aspect of the present invention, the sensor controller can identify a first active capacitive stylus based on a first time slot designated by a configuration packet. Even when a stylus identifier is not added to operation state data, the sensor controller can recognize, from the fact that the operation state data is received in the first time slot, that the operation state data has been transmitted from the first active capacitive stylus. Accordingly, when the first active capacitive stylus transmits operation state data, it can omit transmission of the stylus identifier.

According to the second aspect of the present invention, the sensor controller can acquire, via wireless communication, a first stylus identifier from the first active capacitive stylus, and associate the first stylus identifier with a communication channel, which is used for communication with the first active capacitive stylus, in a communication resource table. Accordingly, even if a stylus identifier is not added to the operation state data, the sensor controller can output the received operation state data in association with the first stylus identifier to a host controller.

BRIEF DESCRIPTION OF THE DRAWINGS

FIG. 3 is a functional block diagram of a sensor controller;
FIG. 8 is a view depicting a communication resource table;
FIG. 14A is a view illustrating an example of a transmission signal from the electronic pen disclosed in Patent Document 1;
and
FIG. 14B is a view illustrating a transmission method of first information by the electronic pen disclosed in Patent Document 1.

DETAILED DESCRIPTION

In the following, exemplary embodiments of the present invention are described with reference to the accompanying drawings.

Figure 1:
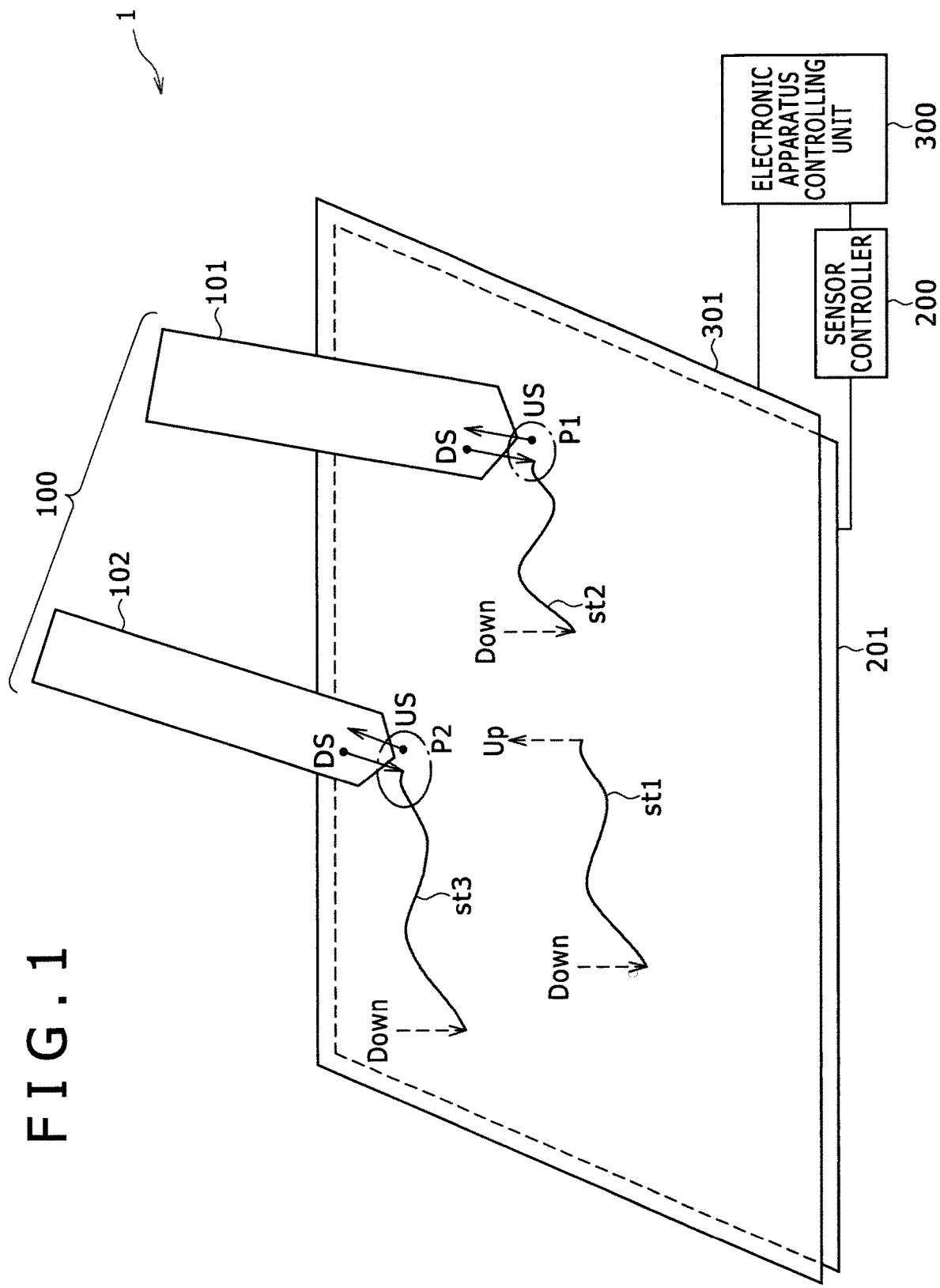
FIG. 1 is a schematic view of a position inputting system.

FIG. 1 is a schematic view of a position inputting system 1 according to one embodiment. Referring to FIG. 1, the position inputting system 1 includes styluses 100 for each pointing to a position, and a sensor controller 200 for deriving a position pointed to by each of the styluses 100 using sensor electrodes 201. The styluses 100 include a first stylus 101 and a second stylus 102, both of which are configured as an active capacitive stylus. As used herein, the stylus 100 means either of the first stylus 101 or the second stylus 102 and is used as a generic term to refer to an unspecified stylus.

(1) In a first usage form, a user may use the first stylus 101 to move it down, move it horizontally for some time to draw a trace st1 in FIG. 1, and then move it up. Thereafter, the user may resume use of the first stylus 101 by moving it down, moving it horizontally for some time to draw a different trace st2, and then moving it up. When the user repeats the cycle from the moving down operation to the moving up operation of the first stylus 101, the first stylus 101 repeats movement of the first stylus 101 into and out of a detection range of the single sensor controller 200.

(2) In a second usage form, the user may set aside the first stylus 101 that the user has been using on the sensor, and then picks up to use the second stylus 102 in place of the first stylus 101, wherein the second stylus 102 has different settings (e.g., type/style of brush) from those of the first stylus 101. In this case, the first stylus 101 and the second stylus 102 alternately repeat movement into and out of the detection range of the single sensor controller 200. In FIG. 1, a trace st3 indicates a trace inputted by the second stylus 102 having settings different from those of the first stylus 101.

Broken line circles P1 and P2 in FIG. 1 indicate positions pointed to by the first stylus 101 and the second stylus 102, respectively. An arrow "DS" in the proximity of the broken line circle P1 indicates a downlink signal DS, which is a signal transmitted in a direction from the first stylus 101 to the sensor controller 200. Another arrow "US" in the proximity of the broken line circle P2 indicates an uplink signal US, which is a signal transmitted in a direction from the sensor controller 200 to the second stylus 102.

The sensor controller 200 uses the downlink signal DS and the uplink signal US to perform bidirectional communication with one or more styluses 100 placed on the sensor electrodes 201. Further, the sensor controller 200 performs a process of supplying the pointed positions of the first stylus 101 and the second stylus 102, while distinguishing the styluses from each other, to an electronic apparatus controlling unit 300 (host controller), which controls an electronic apparatus 301 as a whole.

Figure 2:
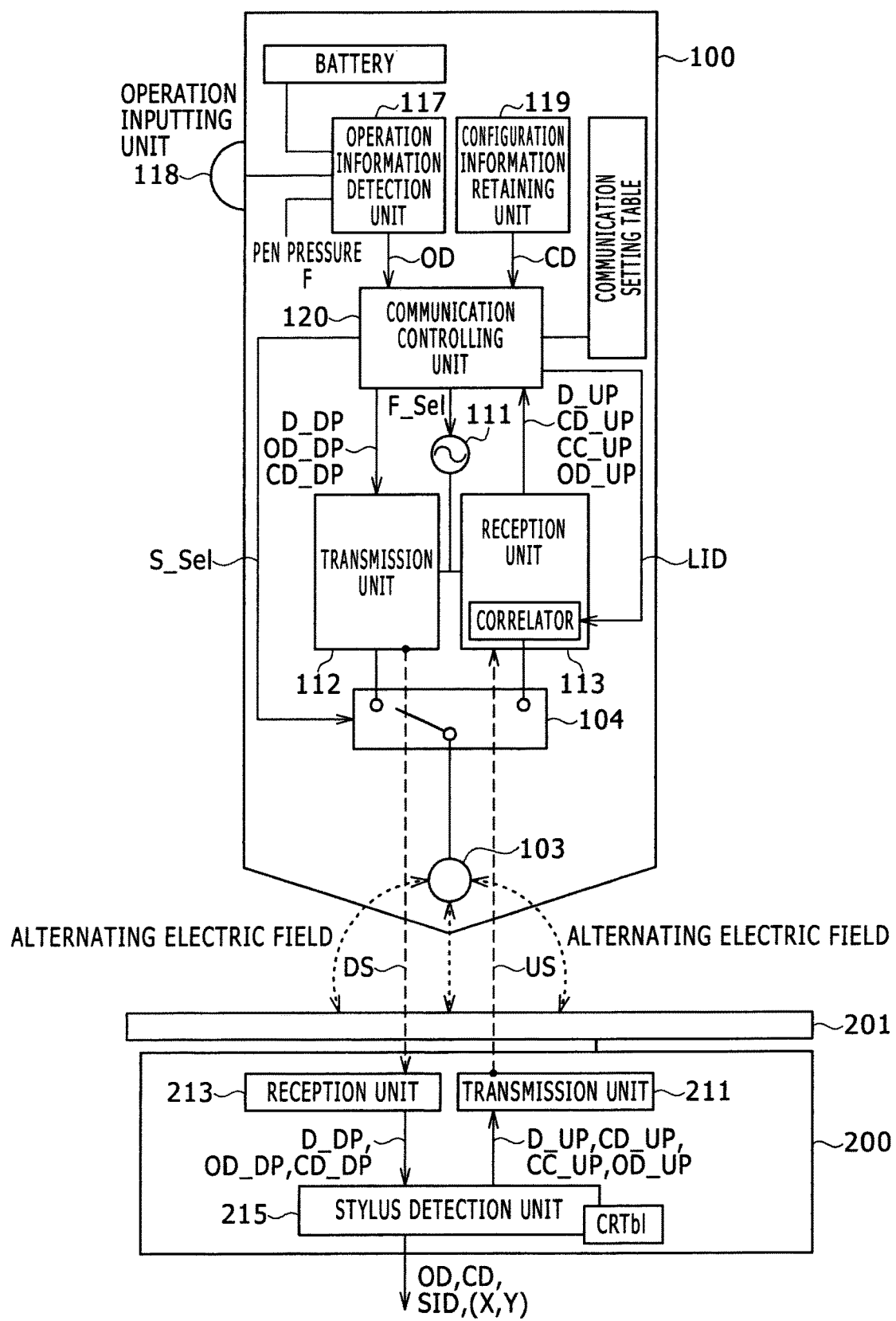
FIG. 2 is a functional block diagram of a stylus.

FIG. 2 is a functional block diagram of the stylus 100. Referring to FIG. 2, the stylus 100 includes an electrode 103, a transmission-reception switching unit 104, an oscillation unit 111, a transmission unit 112, a reception unit 113, an operation information detection unit 117, an operation inputting unit 118, a configuration information retaining unit, and a communication controlling unit 120.

The electrode 103 is a conductor, which generates an alternating electric field corresponding to a downlink signal DS supplied from the transmission-reception switching unit 104. The electrode 103 also generates a charge corresponding to the uplink signal US and supplies the charge to the transmission-reception switching unit 104. These two operations are alternately performed.

The transmission-reception switching unit 104 switches the connection state of the electrode 103 between being connected to the transmission unit 112, or to the reception unit 113, in response to a switching signal S_Sel. The transmission-reception switching unit 104 performs time division switching between transmission and reception within one time slot s, or in the unit of multiple time slots s.

The oscillation unit 111 is an oscillation circuit that generates a signal of a sine wave or a corresponding rectangular wave of one of frequencies f0, f1, f2, . . . (see FIGS. 7A to 7D) in response to a frequency setting signal F_Sel.

The transmission unit 112 generates a downlink signal DS corresponding to a packet to be transmitted (e.g., a discovery response packet D_DP, an operation state transmission packet OD_DP, or an configuration information transmission packet CD_DP) supplied thereto from the communication controlling unit 120. For example, the transmission unit 112 generates a downlink signal DS corresponding to each type of packet, by adding an error detection code and so forth to a bit train configuring a packet to generate a transmission digital signal, digital-to-analog (DA) converting the transmission digital signal to obtain a baseband signal, and modulating a frequency f (f0, f1, f2, . . . ) provided thereto from the oscillation unit 111 with the baseband signal.

Figure 6A:
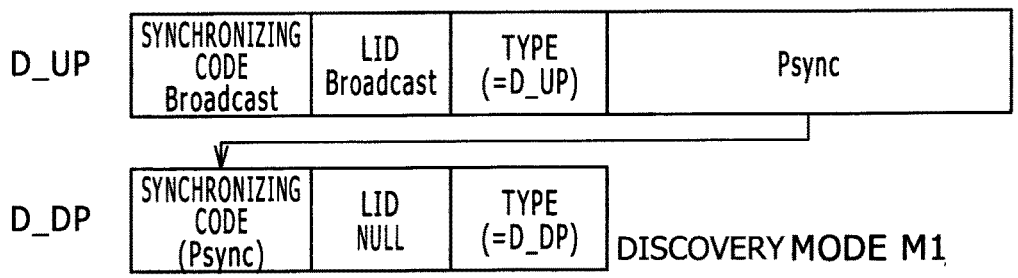
FIGS. 6A to 6D are views illustrating packets communicated in the four operation modes.
Figure 6B:
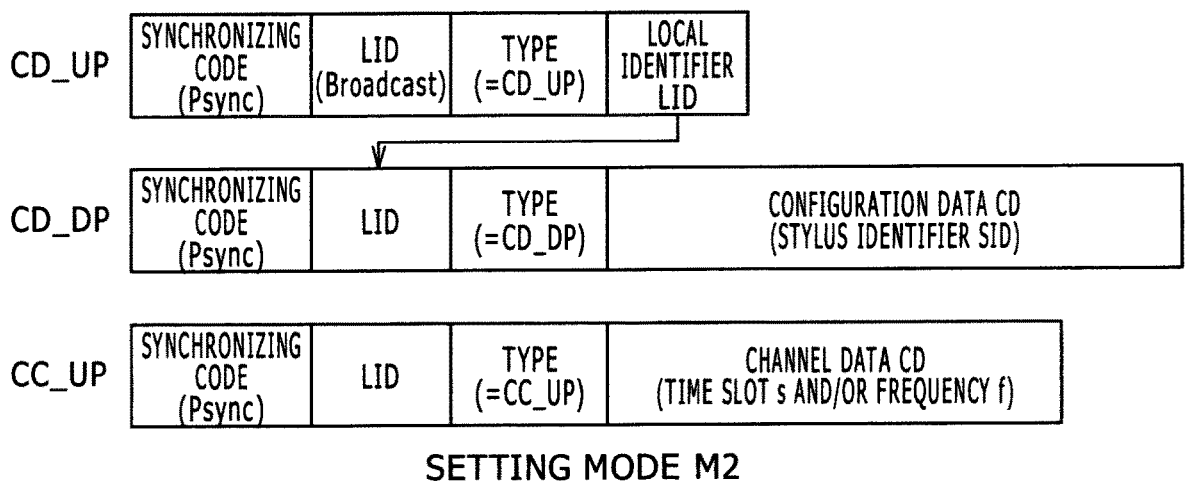

The reception unit 113 extracts a packet from the uplink signal US and supplies the extracted packet to the communication controlling unit 120. For example, the reception unit 113 receives the uplink signal US based on a variation of the charge amount induced in the electrode 103, demodulates (extracts) the baseband signal from the received uplink signal US using the signal of the frequency f provided from the oscillation unit 111, AD converts the baseband signal to obtain a reception digital signal, and uses a value of a local identifier LID (to be described later) to extract a packet that is addressed (directed) to the stylus itself (e.g., a discovery packet D_UP, a configuration information request packet CD_UP, a channel change request packet CC_UP, or an operation state request packet OD_UP). Further, the reception unit 113 uses a synchronizing code (see FIG. 6A) included in the discovery packet D_UP transmitted at the beginning of a predetermined period T (see FIGS. 7A to 7D) to detect start timing of a frame corresponding to the predetermined period T.

The operation information detection unit 117 acquires and outputs operation state data OD, which is information that varies in response to an operation state of the stylus 100, such as an on/off operation of the operation inputting unit 118 (e.g., a button provided on the stylus 100), the value of pen pressure F detected by a pen pressure detection unit (not depicted), and a remaining amount of a battery charge.

The configuration information retaining unit 119 retains configuration data CD, which is static data that does not vary in response to an operation state of the stylus 100 (as opposed to data that varies in response to an operation state of the stylus 100, such as the position of the stylus, a pen pressure applied to the tip of the stylus, and whether or not a button is depressed). The configuration data CD includes, for example, a stylus identifier SID uniquely assigned to each stylus 100, a vendor ID indicative of a manufacturer of the stylus 100, and function information indicative of functions of the stylus 100 (e.g., type of the pen point, a brush type, a number of buttons, etc.).

Figure 10:
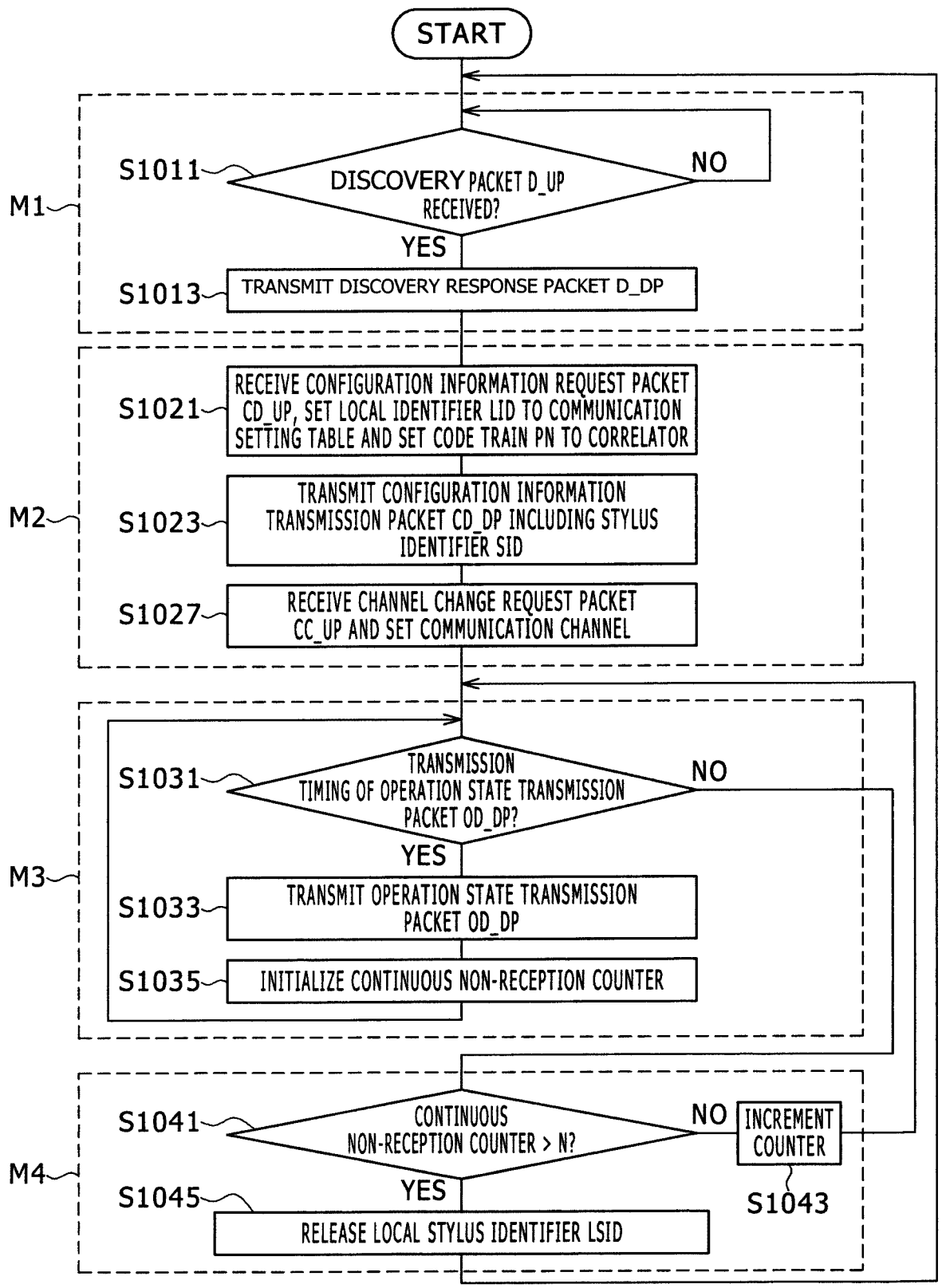
FIG. 10 is an operation flow diagram of the stylus, particularly of a communication controlling unit.

The communication controlling unit 120 utilizes the functional units described above to transmit and receive various packets depicted in FIGS. 6A to 6D, to and from the sensor controller 200, using a communication channel set in the communication setting table to thereby execute a position inputting method shown in a flow chart of FIG. 10.

FIG. 3 is a functional block diagram of the sensor controller 200 used together with the sensor electrodes 201.

The sensor electrodes 201 include a row electrode group 202 including row electrodes 202a, 202b and 202c and a column electrode group 203 including column electrodes 203a, 203b, 203c and 203d, which are disposed two-dimensionally so as to form a plane parallel to a panel of the electronic apparatus 301.

A transmission-reception switching unit 204 is a switch for time-divisionally switching between a transmission time period, within which the row electrode group 202 is used as transmission electrodes, and a reception time period, within which the row electrode group 202 is used as reception electrodes. In a time period within which a signal from the stylus 100 is received, both of the row electrode group 202 and the column electrode group 203 are used as reception electrodes. In a time period within which a signal is transmitted to the stylus 100, the row electrode group 202 is used as transmission electrodes.

The sensor controller 200 includes a transmission unit 211, an oscillation unit 212, a reception unit 213, and a stylus detection unit 215. The sensor controller 200 is connected to the row electrode group 202 through the transmission-reception switching unit 204 and is connected directly to the column electrode group 203.

The oscillation unit 212 generates a signal of a sine wave, or a rectangular wave, of a frequency f, which is one of the frequencies f0, f1, f2, . . . (see FIGS. 7B and 7C), in response to the frequency setting signal F_Sel.

The transmission unit 211 generates an uplink signal US corresponding to any of various packets (e.g., a discovery packet D_UP, a configuration information request packet CD_UP, a channel change request packet CC_UP, and an operation state request packet OD_UP) supplied from the stylus detection unit 215. For example, the transmission unit 211 performs an encoding process including an error correction process, such as to add a repetition code to a bit train configuring a packet, to generate a transmission digital signal. The transmission unit 211 then DA converts the transmission digital signal to obtain a baseband signal, and modulates a (carrier) signal of the frequency f (f0, f1, f2, . . . ) supplied from the oscillation unit 212 by the baseband signal to generate an uplink signal US. The uplink signal US is transmitted from the entire area of the panel, including regions in the proximity of the circles P1 and P2, so that not only a stylus 100 whose position is known already but also a new stylus 100 whose position is not yet known can be detected.

The reception unit 213 receives a downlink signal DS as an input and outputs a packet extracted from the received downlink signal DS. For example, the reception unit 213 multiplies the downlink signal DS, which is a modulated signal, by a carrier signal supplied from the oscillation unit 212 to demodulate (extract) the baseband signal. The reception unit 213 AD converts the demodulated baseband signal to obtain a reception digital signal and performs error correction and so forth to extract a packet. At the same time, the reception unit 213 supplies position information Pos representative of an electrode, at which the downlink signal DS corresponding to the packet is received, to the stylus detection unit 215.

The stylus detection unit 215 executes a position inputting method depicted in the flow chart of FIG. 9 using the functional units described hereinabove. For example, the stylus detection unit 215 stores, as an entry in a communication resource table CRTbl, a relationship between a communication channel allocated to a stylus 100 and configuration data CD of the stylus 100. The stylus detection unit 215 and the stylus 100 use the allocated communication channel to perform transmission and reception of various packets depicted in FIGS. 4A to 4D. The stylus detection unit 215 associates the packets from the stylus 100 with its configuration data CD (such as the stylus identifier SID of the stylus 100) and supplies them to the electronic apparatus controlling unit 300.

FIGS. 4A to 4D are views illustrating four operation modes M1 to M4 of the sensor controller 200 and the stylus 100 in the position inputting method of the present invention.

Figure 4A:
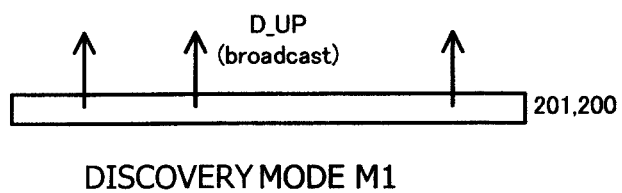
FIGS. 4A to 4D are views illustrating four different operation modes.

FIG. 4A is a view illustrating the discovery mode M1. In the discovery mode M1, the sensor controller 200 and a stylus 100 mutually search for a communication partner. The sensor controller 200 transmits a discovery packet D_UP including identification information of the sensor controller 200 in a slot after every predetermined period of time (for example, in a slot after every eight time slots). The discover packet notifies the stylus 100 of the presence of the sensor controller 200 and of the starting timing of a frame period. If the stylus 100 detects the discovery packet D_UP, then it returns a discovery response packet D_DP.

Figure 4B:
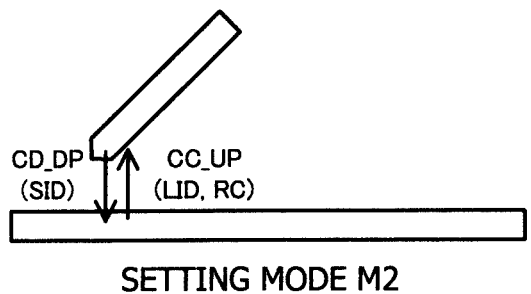

FIG. 4B is a view illustrating the setting mode M2. In the setting mode M2, the sensor controller 200 uses a default communication channel (first communication channel) to set a second communication channel to be used for communication between the sensor controller 200 and the stylus 100.

The sensor controller 200 sets a local identifier LID, which temporarily identifies the detected first stylus 101, and also sets a communication channel to be used for communication with the first stylus 101. The sensor controller 200 notifies the local identifier LID and the communication channel to the stylus 101 using a configuration information request packet CD_UP and a channel change request packet CC_UP, respectively.

In the setting mode M2 (after the discovery mode M1 but before the stroke mode M3), the first stylus 101 initially transmits configuration data CD including the stylus identifier SID using the default communication channel (the first communication channel).

Here, the communication between the sensor controller 200 and the stylus 101 is carried out, for example, using a frequency time division multiple access method. A communication channel in the case where a frequency time division multiple access is used is specified by the frequency f and the time slot s. Accordingly, the channel change request packet CC_UP includes frequency allocation information that designates a frequency f and time slot allocation information that designates a time slot s (see FIG. 6B). It is to be noted that the frequency allocation information may be included not in the channel change request packet CC_UP but in the discovery packet D_UP to be conveyed to the stylus 101. Similarly, the local identifier LID may be conveyed to the stylus 101, not in the configuration information request packet CD_UP, but in the discovery packet D_UP.

Figure 4C:
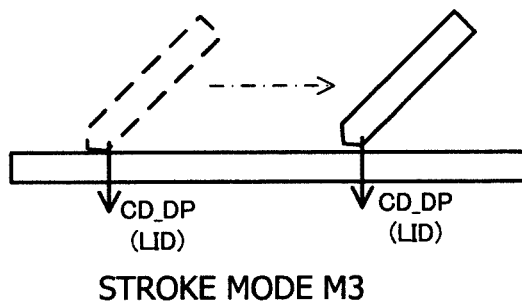

FIG. 4C is a view illustrating the stroke mode M3. In the stroke mode M3, the stylus 100 and the sensor controller 200 perform transmission and reception of operation state data OD, such as a pen pressure F, using the communication channel (the second communication channel) set up in the setting mode M2. In the stroke mode M3, transmission of the configuration data CD such as the stylus identifier SID, which does not vary depending on an operation state of the stylus, is omitted.

Figure 4D:
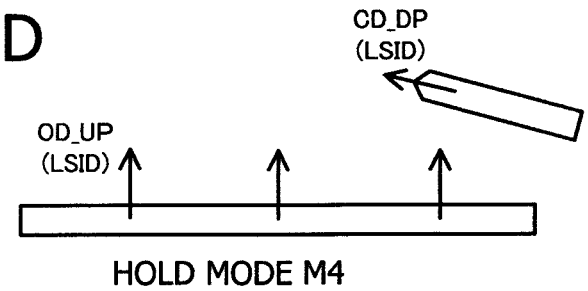

FIG. 4D is a view illustrating the hold mode M4. The hold mode M4 is a state in which the communication channel (the second communication channel) established in the setting mode M2 and the local identifier LID allocated to the stylus 100 are (temporarily) maintained, for example, when the user lifts the stylus 100 from the sensor panel and holds it in the air for some time before lowering it again to resume the handwriting operation. The sensor controller 200 and the stylus 100, when detecting communication packets transmitted using the local identifier LID and the communication resource (the second communication channel) established in the setting mode M2, determine to return to the stroke mode M and continue using the local identifier LID and the communication resource. On the other hand, when the sensor controller 200 and the stylus 100 do not detect communication packets transmitted using the local identifier LID and the communication resource set up in the setting mode M2 for more than a defined period of time, they release the local identifier LID and the communication resource and return to the discovery mode M1.

Figure 5A:
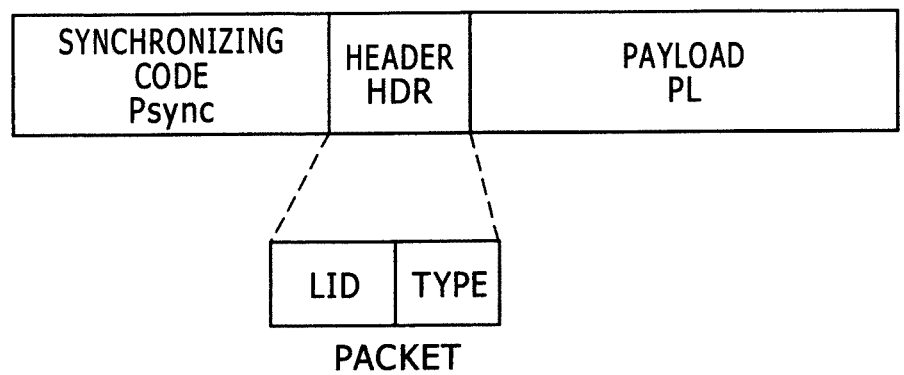
FIGS. 5A and 5B are views depicting a common format for various packets.
Figure 5B:
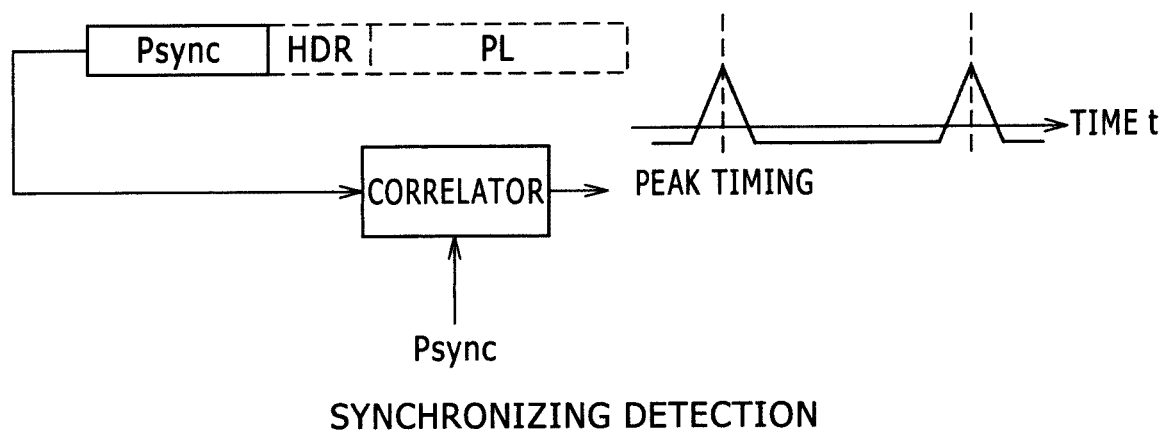

FIGS. 5A and 5B are views depicting a common format for various packets. A packet is configured including a synchronizing code Psync at the beginning and a header HDR and a payload PL (FIG. 5A).

The synchronizing code Psync is a code used by the stylus 100 to establish synchronization with the clock of the sensor controller 200. The synchronizing code Psync may be, for example, a PN code or a Barker code selected by the sensor controller 200. The reception unit 113 of the stylus 100 detects a peak timing of a correlation value between the reception digital signal and the synchronizing code Psync to establish synchronization with the clock of the sensor controller 200 (FIG. 5B).

The synchronizing code Psync is selected by the sensor controller 200 so that the stylus 100 can identify the sensor controller 200 based on the synchronizing code Psync. The code selected by the sensor controller 200 is notified from the sensor controller 200 to the stylus 100 in a discovery packet D_UP, to be described below (see FIG. 6A). The synchronizing code to be included in the synchronization code field of the discovery packet D_UP itself need not be the synchronizing code Psync, and may be a code prestored in each of the styluses 100 and the sensor controller 200 (e.g., synchronizing code Broadcast depicted in FIG. 6A). However, use of the synchronization code Psync for the purpose of identifying the sensor controller 200 is not always required, and in some embodiments the synchronizing code Broadcast may be used as a synchronizing code in all other packets in addition to the discovery packet D_UP. The synchronizing code Broadcast is configured from a PN code or a Barker code, similarly to the synchronizing code Psync.

The header HDR includes a local identifier LID and type information TYPE of the packet.

The local identifier LID is an identifier for uniquely identifying a stylus 100, from among multiple styluses 100 that may be used with the sensor controller 200. The local identifier LID in a packet is used to identify the particular stylus 100, which is to receive the packet addressed to that stylus 100, or which has transmitted the packet including the local identifier LID.

The local identifier LID is information that represents an address selected from among a plurality of addresses. For example, where the local identifier LID is formed of 3 bits, the local identifier LID can represent one address to be selected from among $2^3=8$ addresses. The number of bits of the local identifier LID is preferably smaller than the number of bits of the stylus identifier SID. For example, preferably the stylus identifier SID is information of 5 bits or more, while the local identifier LID is information of 4 bits or less. A bit number of the local identifier LID is preferably selected to be a number sufficient for identify those styluses 100 which may be used alternately or substantially simultaneously on one sensor controller 200. For example, if 3 bits are used, it is possible to identify seven different styluses 100 while using one address as a Broadcast ID (meaning that all of the seven styluses 100 are addresses).

The first stylus 101 decides whether or not the local identifier LID included in the reception digital signal and the local identifier LID stored in its own communication setting table (see FIG. 2) coincide with each other, to determine whether the packet is destined for the stylus itself (first stylus 101) or for a different stylus (e.g., second stylus 102). A similar process to that performed regarding the first stylus 101 is performed regarding the second stylus 102.

The type information TYPE is a field used to distinguish the type of packet (see FIGS. 6A to 6D). The payload PL includes payload data corresponding to the type of packet.

Here, packets to be transmitted from a stylus 100 and the sensor controller 200 are preferably transmitted in a state in which they are spread by a spread spectrum system such as, for example, a direct spread spectrum system (DSSS). Spread codes used in this case may be prestored in both of the stylus 100 and the sensor controller 200. By using a spread spectrum system in this manner, robust communication not susceptible to noise becomes possible.

FIGS. 6A to 6D are views illustrating packets to be communicated in the four operation modes M1 to M4 of the position inputting system 1.

(a) Packets to be Utilized in the Discovery Mode M1

The discovery packet D_UP is a packet (discovery packet) to be sent from the sensor controller 200 to an unspecified stylus 100 to detect a new stylus 100 and notify it of the presence of the sensor controller 200, and to supply a timing reference of a predetermined period T to the first stylus 101 or the second stylus 102 which has been detected already. A synchronizing code portion of the discovery packet D_UP includes, instead of the synchronizing code Psync, the synchronizing code Broadcast which can be received by any unspecified stylus 100. The payload of the discovery packet D_UP includes information including the synchronizing code Psync that identifies the sensor controller 200, from which the discovery packet D_UP is transmitted. As described above, any packet other than the discovery packet D_UP may also use the synchronizing code Broadcast as the synchronizing code; in such case the discovery packet D_UP need not include information identifying the synchronizing code Psync in the payload.

The discovery response packet D_DP is a packet (response packet) transmitted from the stylus 100 (e.g., first active capacitive stylus 101), which has received the discovery packet D_UP, as a response to the sensor controller 200. Where the payload of the discovery packet D_UP includes information that identifies the synchronizing code Psync, the synchronizing code Psync is used as the synchronizing code of the discovery response packet D_DP transmitted from the stylus.

(b) Packets to be Utilized in the Setting Mode M2

The configuration information request packet CD_UP is a packet by which the sensor controller 200 requests the stylus 100, which has responded with a discovery response packet D_DP, to transmit its configuration data CD including the stylus identifier SID. Prior to transmitting the configuration information request packet CD_UP, the sensor controller 200 performs a process to determine a local identifier LID to be assigned to the stylus 100, from which the discovery response packet D_DP is receives, and includes information regarding the assigned local identifier LID in the payload PL of the configuration information request packet CD_UP. In assigning the local identifier LID, the sensor controller 200 selects different local identifiers LID for different styluses 100, respectively, which are detected to be present on the sensor panel. As such, the local identifier LID is information that can be used to distinguish one or more styluses 100 existing on the sensor panel.

The configuration information transmission packet CD_DP is a packet transmitted from the stylus 100 and includes static configuration data CD, such as the stylus identifier SID, which does not vary depending upon an operation state of the stylus 100.

The channel change request packet CC_UP is a configuration packet (or a setting packet), which notifies a communication channel (second communication channel) to the stylus 100, to which the sensor controller 200 has assigned the local identifier LID, so that the stylus 100 can transmit its operation state data OD on the notified communication channel. The channel change request packet CC_UP includes channel data CHD indicative of the communication channel. In various exemplary embodiments the communication channel is defined by a time slot s and/or a frequency f assigned to a particular stylus.

For example, specific information included in the channel data CHD may include time slot designation information, which may be in the form of an offset time period from a reference timing, wherein the reference timing indicates the starting time of a frame. For example, in the example of FIG. 7A hereinafter described, the reference timing is a transmission timing of a communication channel 700. A communication channel 701 is designated (defined) with the offset time period +1 (relative to 700), which is used as the time slot designation information in this case. A communication channel 702 is designated with the offset time period +2 (relative to 700), used as the time slot allocation information in this case. Meanwhile, frequency allocation information that designates any one of a plurality of frequencies determined in advance can be included in the channel data CHD. While typically the channel data CHD is transmitted in the setting mode M2, all or part (for example, only frequency allocation information) of the channel data CHD may be included in the discovery packet D_UP. It is to be noted that, as the time slot allocation information, an interval time period, at which each of subsequent transmission time slots is repeated after the offset time period, may be indicated in addition to the offset time period. For example, if the offset is set to +1 and the interval is designated as 2 time slots, then time slots s8n+1, s8n+3, s8n+5, s8n+7, and so forth, may be designated.

(c) Packets to be Communicated in the Stroke Mode M3
(d) Packets to be Communicated in the Hold Mode M4

The operation state request packet OD_UP is a packet that requests the stylus 100 designated by the local identifier LID to transmit operation state data OD. The operation state request packet OD_UP does not include any data in the payload part thereof.

Figures 6C, 6D:
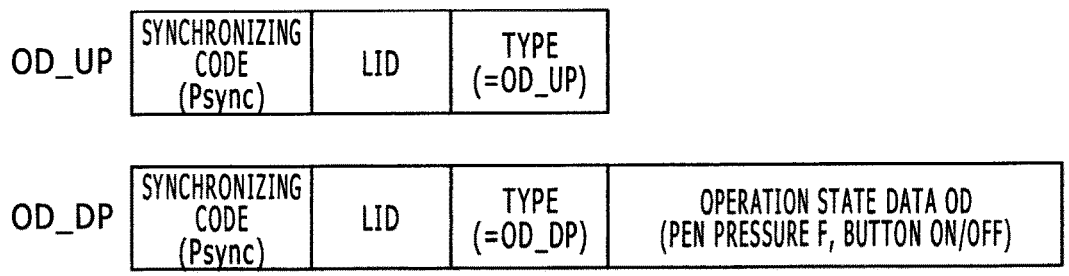

The operation state transmission packet OD_DP is a packet transmitted from the stylus 100 and includes operation state data OD, which varies depending upon an operation state of the stylus 100 such as the pen pressure F data, a button operation state data, and so forth. Although the operation state transmission packet OD_DP does not include configuration data CD such as a stylus identifier SID, it may include the local identifier LID as depicted in FIG. 6D. However, in some embodiments, since the sensor controller 200 can identify which stylus 100 has transmitted the operation state transmission packet OD_DP based on which communication channel the operation state transmission packet OD_DP is received, the local identifier LID need not be included in the operation state transmission packet OD_DP. Further, the stylus may transmit the state transmission packet OD_DP without having necessarily received a request from the sensor controller in the operation state request packet OD_UP.

FIGS. 7A to 7D are views illustrating communication channels allocated by the sensor controller 200. In FIGS. 7A to 7D, the axis of abscissa indicates time slots s0, s1, s2, . . . defined by a period T. A period T is defined between the sensor controller 200 and a stylus 100, which is to communicate with the sensor controller 200, with reference to the clock of the sensor controller 200. A time slot s may be a transmission time period or a reception time period, or a combination of both a transmission time period and a reception time period. The axis of ordinate in FIGS. 7A to 7D indicates the frequency f, and frequencies f0, f1, f2, . . . to be used for communication.

The communication channel is defined by a time domain (time slot s) and/or a frequency domain (frequency f) as described above and is allocated (designated) by the sensor controller 200.

In FIGS. 7A to 7D, the communication channel 700 indicated by slanted lines is a default communication channel (first communication channel) provided in order for the sensor controller 200 to search for a new stylus 100 in the discovery mode M1, or to perform communication with the first stylus 101 detected in the discovery mode M1.

In FIGS. 7A to 7D, the communication channel 701 indicated as a white frame represents a communication channel (second communication channel) allocated to the detected first stylus 101, on which the sensor controller 200 and the first stylus 101 may communicate with each other in the stroke mode M3 and in the hold mode M4.

In FIGS. 7A to 7D, the communication channel 702 indicated as a black frame also depicts a communication channel (second communication channel) allocated to another detected stylus, such as the second stylus 102, on which the sensor controller 200 and the second stylus 102 may communicate with each other in the stroke mode M3 and in the hold mode M4.

Figure 7A:
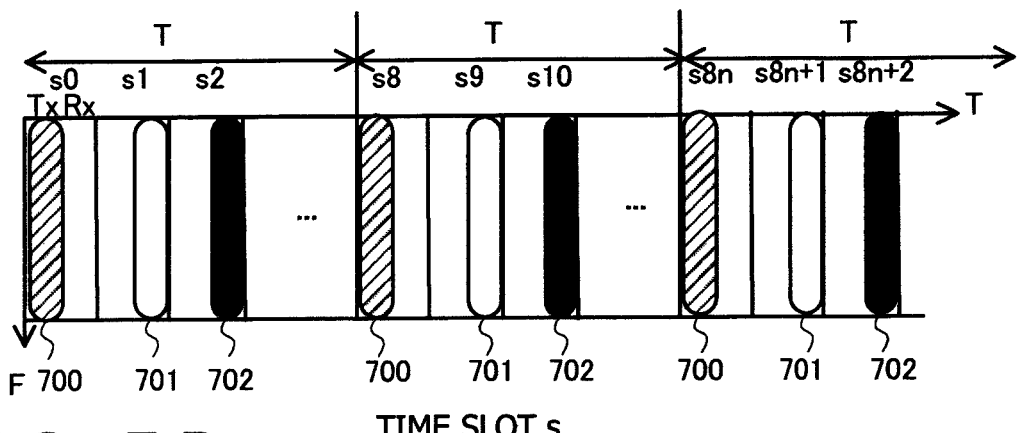
FIGS. 7A to 7D are views illustrating communication channels.

FIG. 7A depicts an example in which a communication channel is defined by time slots s. In this example, after every eight time slots s in a period (frame period) indicated by s8n (n is 0 or a positive integer), a communication resource represented by the time slot s8n is reserved as the default communication channel 700 (first communication channel) to be used, for example, in the discovery mode M1 by the sensor controller 200. The communication channel 700 is used for the sensor controller 200 to share, with the first stylus 101 and the second stylus 102, starting time of the period T (frame period) where one period includes eight time slots of s0 to s7. Time slot s8n+1 subsequent to time slot s8n used by the sensor controller 200 is allocated to the first stylus 101 and forms the communication channel 701 (second communication channel) for the first stylus 101. A further time slot s8n+2 is allocated to the second stylus 102 and forms the communication channel 702 (second communication channel) for the second stylus 102.

Figure 7B:
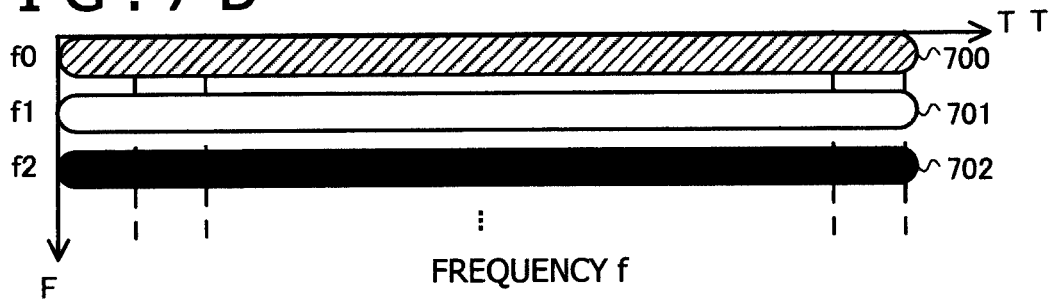

FIG. 7B depicts an example wherein a communication channel is defined by a frequency f. In the example, the communication channel of the frequency f0 defines the default communication channel 700 (first communication channel) to be used in the discovery mode M1 or in the setting mode M2 by the sensor controller 200. The communication channel 701 of frequency f1 (second communication channel) is assigned for the sensor controller 200 to communicate with the first stylus 101 in the stroke mode M3 or in the hold mode M4. The communication channel 702 of frequency f2 (another second communication channel) is assigned for the sensor controller 200 to communicate with the second stylus 102 in the stroke mode M3 or in the hold mode M4.

Figure 7C:
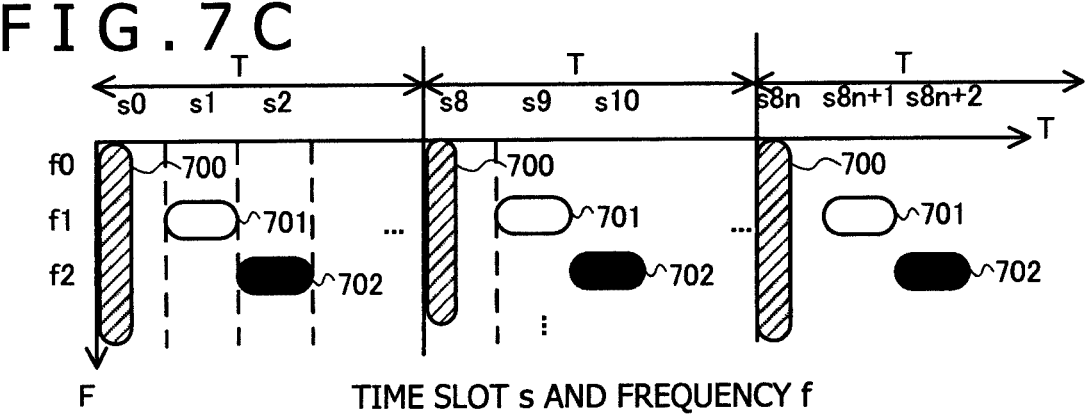

FIG. 7C depicts an example in which a communication channel is defined by a set of time slots s and a frequency f. In the example, the communication channel defined by the time slot s8n is the default communication channel 700 (first communication channel), which is used in the discovery mode M1 or in the setting mode M2 by the sensor controller 200. The communication channel 700 is set across the entire frequency range f, on which the sensor controller 200 may transmit a discovery packet D_UP to notify any styluses (e.g., the first stylus 101 or the second stylus 102) of a starting timing of a period T. The communication channel 701 (second communication channel) is configured for the sensor controller 200 to communicate with the first stylus 101 in the stroke mode M3 or in the hold mode M4. The communication channel 701 is defined by the frequency f1 and the time slot s8n+1. The communication channel 702 (second communication channel) is configured for the sensor controller 200 to communicate with the second stylus 102 in the stroke mode M3 or in the hold mode M4. The communication channel 702 is defined by the frequency f2 and the time slot s8n+2.

Figure 7D:
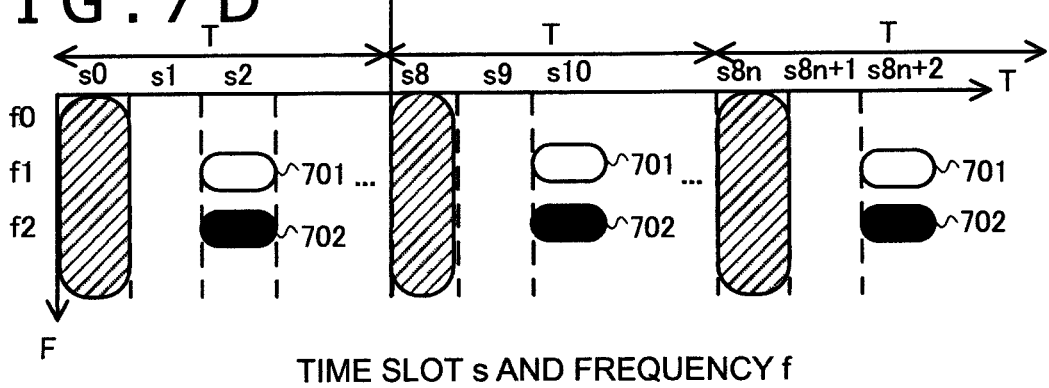

FIG. 7D depicts another example in which a communication channel is defined by a set of time slots s and a frequency f. The communication channel 700 indicated by slanted lines is defined by the time slot s8n (n is 0 or a positive integer), similarly to that in FIG. 7A. The communication channel 701 (second communication channel) is configured for the sensor controller 200 to communicate with the first stylus 101 in the stroke mode M3 or in the hold mode M4. The communication channel 701 is defined by the frequency f1 and the time slot s8n+2. The communication channel 702 (second communication channel) is configured for the sensor controller 200 to communicate with the second stylus 102 in the stroke mode M3 or in the hold mode M4. The communication channel 702 is defined by the frequency f2 and the time slot s8n+2.

FIG. 8 is a view depicting a communication resource table CRTbl of the stylus detection unit 215. In an entry indicated by a row of the table, a local identifier LID, a communication channel (time slot s and/or frequency f) assigned to a stylus 100, and configuration data CD such as a stylus identifier SID acquired in the setting mode M2 are stored.

When processing up to the setting mode M2 is completed between the sensor controller 200 and a stylus 100, all fields of the table entry for the stylus 100 are filled.

The entry 801 includes information regarding the first stylus 101. If the stylus detection unit 215 receives an operation state transmission packet OD_DP from the first stylus 101, then it decides, on the basis of the value of the local identifier LID included in the operation state transmission packet OD_DP or the communication channel 701 on which the operation state transmission packet OD_DP is received, that the position indicated by transmission of the operation state transmission packet OD_DP has originated from the first stylus 101.

The entry 802 includes information regarding the second stylus 102. If the stylus detection unit 215 receives an operation state transmission packet OD_DP from the second stylus 102, then it decides, on the basis of the value of the local identifier LID included in the operation state transmission packet OD_DP or the communication channel 702 on which the operation state transmission packet OD_DP is received, that the position indicated by transmission of the operation state transmission packet OD_DP has originated from the second stylus 102.

Each entry of the communication resource table CRTbl is deleted (purged) when the sensor controller 200 and the stylus 100 return from the hold mode M4 to the discovery mode M1.

Figure 9:
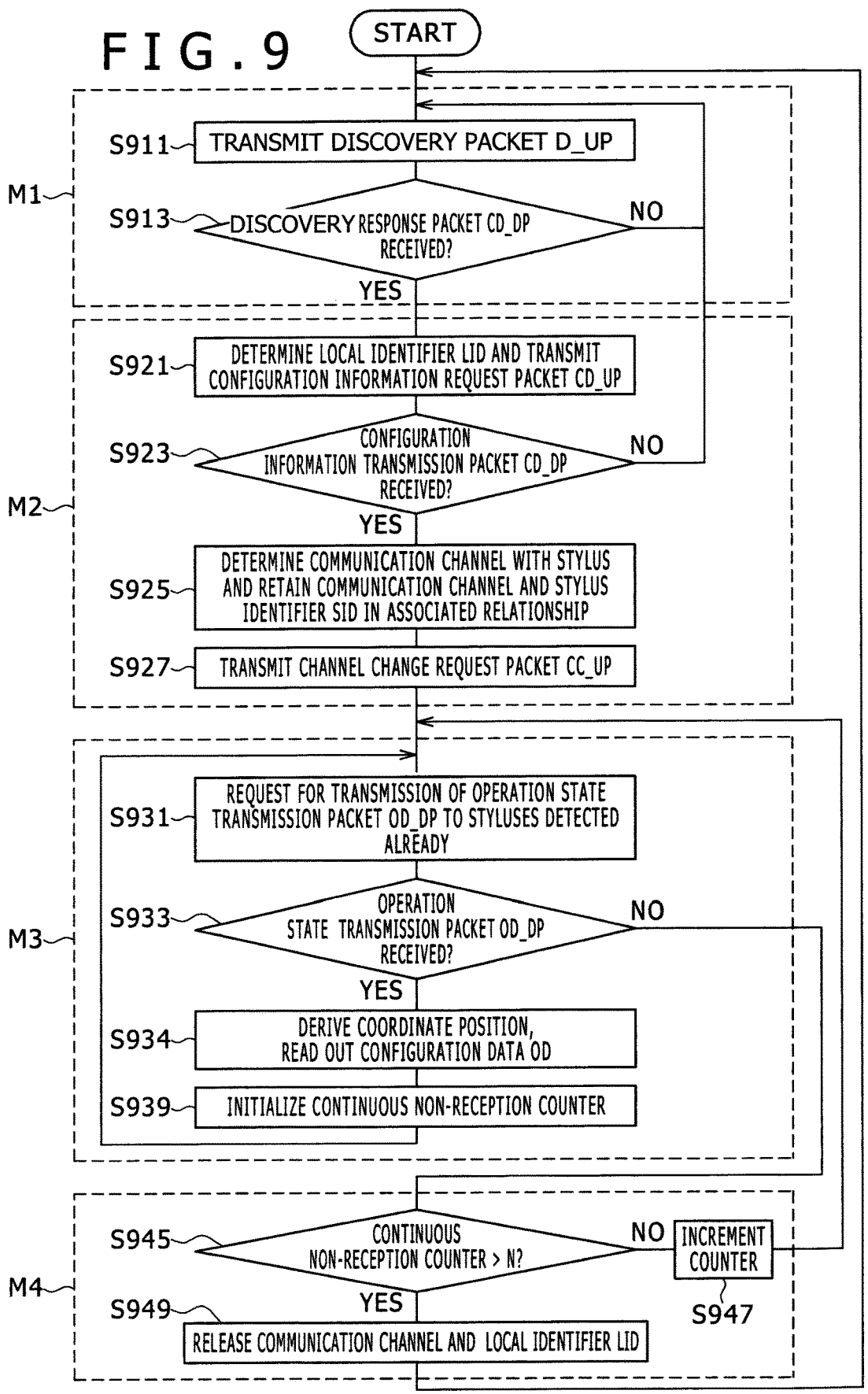
FIG. 9 is an operation flow diagram of the sensor controller, particularly of a stylus detection unit.

FIG. 9 is an operation flow chart of the sensor controller 200 (stylus detection unit 215).

<Discovery Mode M1: Sensor Controller 200>

The sensor controller 200 starts its operation in the discovery mode M1. At step S911, the sensor controller 200 uses the communication channel 700 (first communication channel) in the time slot s8n (n is 0 or a positive integer) depicted in FIG. 7A or 7D to transmit a discovery packet D_UP. At step S913, transmission of the discovery packet D_UP is repeated according to a defined period T (for example, after every eight time slots) until a discovery response packet D_DP is received at step S913.

<Setting Mode M2: Sensor Controller 200>

When the sensor controller 200 receives a discovery response packet D_DP from a stylus 100 at step S913, then the operation mode of the sensor controller 200 changes to the setting mode M2. It should be noted that, even after the mode changes to the setting mode M2 or to a subsequent mode, transmission of the discovery packet D_UP is repeated in order to detect a different new stylus 100.

At step S921, the sensor controller 200 assigns a local identifier LID for identifying the detected stylus 100. Then, the sensor controller 200 sends to the stylus 100 a configuration information request packet CD_UP including the assigned local identifier LID.

At step S923, the sensor controller 200 receives a configuration information transmission packet CD_DP from the stylus 100 (YES at S923) and detects configuration data CD, such as a stylus identifier SID, included in the configuration information transmission packet CD_DP.

At step s925, the sensor controller 200 determines a communication channel (second communication channel) to be used for subsequent communication with the stylus 100. For example, according to the example of FIG. 7D, the sensor controller 200 allocates (designates) the communication channel 701 defined by the time slot s8n+1 (n is 0 or a positive integer) and the frequency f1 to the first stylus 101. The sensor controller 200 registers a corresponding relationship between the allocated communication channel 701 and the configuration data CD in the communication resource table CRTbl of FIG. 8.

At step S927, the sensor controller 200 transmits a channel change request packet CC_UP to the stylus 100, to notify the stylus 100 of the set of the time slot s8n+1 (n is 0 or a positive integer) and the frequency f1 that are determined for the stylus 100, wherein the set defines the communication channel 701 (second communication channel) allocated to the stylus 100 for use in communication in the stroke mode M3.

It is to be noted that the sensor controller 200 may determine a portion (e.g., a frequency) of a communication channel and a local identifier LID prior to transmission of the discovery packet D_UP. The sensor controller 200 may then include the determined information (e.g., the frequency and the LID) in the discovery packet D_UP. This makes it possible for the stylus 100 to quickly obtain the local identifier LID allocated to the stylus 100 and a portion (e.g., a frequency) of the communication channel in the discovery packet D_UP, without having to wait for the configuration information request packet CD_UP and the channel change request packet CC_UP.

<Stroke Mode M3: Sensor Controller 200>

Starting with step S931, a process for repeatedly performing reception of am operation state transmission packet OD_DP is performed.

First, at step S931, the sensor controller 200 requests a stylus or styluses, which are already detected (or linked/connected) and thus are registered in the communication resource table CRTbl, to transmit an operation state transmission packet OD_DP. This request may be performed by the sensor controller 200 explicitly transmitting, to the stylus 100, an operation state request packet OD_UP, or by the sensor controller merely transmitting, to the stylus 100, a discovery packet D_UP in a particular time slot s. For example, in the latter case, the sensor controller 200 transmits the discovery packet D_UP in the time slot s8n (n is 0 or a positive integer) to implicitly expect the operation state transmission packet OD_DP to be transmitted in the second communication channel (e.g., in the time slot s8n+1 following the time slot s8n, and in the frequency f1).

The stylus detection unit 215 (see FIG. 3) of the sensor controller 200, which receives the operation state transmission packet OD_DP in the second communication channel, derives a coordinate position of the stylus 100 based on position information Pos supplied thereto from the reception unit 213. The stylus detection unit 215 also reads out, from the communication resource table CRTbl, configuration data CD that corresponds to the communication channel in which the operation state transmission packet OD_DP is received (step S934). Then, the stylus detection unit 215 supplies the derived coordinate position and the stylus identifier SID included in the configuration data CD, in an associated relationship with each other, to the electronic apparatus controlling unit 300. It is to be noted that, at this time, operation state data OD may naturally be extracted from the operation state transmission packet OD_DP and supplied to the electronic apparatus controlling unit 300 together with the coordinate position.

At step S939, the sensor controller 200 initializes the value of a continuous non-reception counter and repeats the process of step S931 to continue the operation in the stroke mode M3.

In the stroke mode M3, while the user continues to operate the stylus 100 on the sensor panel after the user first lowers the stylus 100 onto the sensor panel until the user lifts the stylus 100 up from the sensor panel, the stylus 100 can be identified based on the communication channel assigned to the stylus 100 or based on the local identifier LID assigned to the communication channel. Therefore, transmission of the stylus identifier SID having the full length of 48 bits or 64 bits can be omitted.

<Hold Mode M4: Sensor Controller 200>

On the other hand, if an operation state transmission packet OD_DP is not received at step S933, then the sensor controller 200 detects at step S945 how many times (e.g., periods) an operation state transmission packet OD_DP has not been received consecutively. If packets are not received consecutively from the stylus 100, which was once in the stroke mode M3, then there is the possibility that the user has temporarily lifted the stylus 100 from the panel and is holding it in the air until the user again lowers the stylus 100 toward the panel. Thus, when an operation state transmission packet OD_DP is not received consecutively N or less number of times, the sensor controller 200 maintains the communication channel (second communication channel) used for communication with the stylus 100.

For example, the sensor controller 200 increments the continuous non-reception counter at step S947 and waits to receive an operation state transmission packet OD_DP while maintaining the second communication channel. If an operation state transmission packet OD_DP is received in this state, then the sensor controller 200 receives the operation state data OD using the same second communication channel, which the sensor controller 200 has used when the stylus was previously in the stroke mode M3, and supplies the operation state data OD together with the configuration data CD associated with the second communication channel to the electronic apparatus controlling unit 300.

On the other hand, if it is detected that an operation state transmission packet OD_DP is not received consecutively for a number of times that exceeds N times at step S945, then the sensor controller 200 determines that the user has not lifted the stylus 100 merely temporarily but rather has stopped the use of the stylus 100 altogether. In this case, the sensor controller 200 deletes the pertaining entry from the communication resource table CRTbl, releases the second communication channel and the local identifier LID (step S949), and then returns to the discovery mode M1, in which communication is performed using the first communication channel.

FIG. 10 is an operation flow diagram of a stylus 100 (communication controlling unit 120).

<Discovery mode M1: Stylus 100>

The stylus 100 starts its operation in the discovery mode M1. At step S1011, the stylus 100 performs detection of a discovery packet D_UP in a default communication channel (first communication channel). If a discovery packet D_UP is not received (No at S1011), then the stylus 100 repeats detection of a discovery packet D_UP in a predetermined cycle (period). If a discovery packet D_UP is received at step S1011, then the stylus 100 acquires a synchronizing code Psync from the discovery packet D_UP and sends out a discovery response packet D_DP. The stylus copies the successfully acquired synchronizing code Psync into the discovery response packet D_DP. If the stylus cannot acquire the synchronizing code Psync from the discovery packet D_UP, the stylus includes the synchronizing code Broadcast included in the discovery packet D_UP in the discovery response packet D_DP.

<Setting Mode M2: Stylus 100>

At step S1021, the stylus 100 acquires a local identifier LID included in the configuration information request packet CD_UP (or in the discovery packet D_UP) and sets the local identifier LID in the communication setting table depicted in FIG. 2. Further, the stylus 100 sets a code train PN indicative of the synchronizing code Psync (or the synchronizing code Broadcast) acquired from the discovery packet D_UP in a correlator of the reception unit 113.

At step S1023, the stylus 100 transmits a configuration information transmission packet CD_DP, which includes configuration data CD such as the stylus identifier SID. Since, typically, the operation in the setting mode M2 is performed only once upon initiation of each communication, even when the stylus identifier SID is as long as 48 bits or 64 bits or when configuration data CD includes additional information such as a vendor ID or a brush type, the amount of communication resources needed for the transmission of the configuration data CD is reduced as compared to the communication method disclosed in Patent Document 1 described above. It should be noted that, in the initial communication of the stylus identifier SID represented by a large number of bits, the configuration information transmission packet CD_DP may be transmitted in a divided manner using a plurality of time slots.

At step S1027, the stylus 100 receives a channel change request packet CC_UP and acquires a communication channel (second communication channel) designated by the channel change request packet CC_UP. It is to be noted that, where a portion of the communication channel has been notified in a discovery packet D_UP, the stylus 100 combines the already-received portion of the communication channel with the remaining portion designated by the channel change request packet CC_UP to acquire the communication channel (second communication channel). The stylus 100 sets information regarding the acquired communication channel (frequency f (e.g., f1) and time slots s (e.g., s8$n$+1)) in the communication setting table depicted in FIG. 2, and configures the oscillation unit 111 and the transmission-reception switching unit 104 based on the information, to thereby use the communication channel (second communication channel) for communication in the stroke mode M3.

<Stroke Mode M3: Stylus 100>

At step S1031, the stylus 100 decides whether the present point of time is a transmission timing for an operation state transmission packet OD_DP. This decision may be prompted by receipt of an operation state request packet OD_UP transmitted explicitly from the sensor controller 200, or by receipt of a discovery packet D_UP transmitted in the time slot s8$n$ from the sensor controller 200, which implicitly designates the subsequent time slot s8$n$+1 as the time slot in which the stylus 100 is to transmit the operation state transmission packet OD_DP.

If the result of the decision at step S1031 is YES, then the stylus 100 transmits the operation state transmission packet OD_DP in, for example, the second communication channel (frequency f1 and time slot s8$n$+1) depicted in FIG. 7D. At step S1035, the stylus 100 initializes the value of the continuous non-reception counter and returns to the process of step S1031. Thus, the stylus 100 continues the operation in the stroke mode M3 until it is lifted from the panel. Typically, during a period of time after the stylus 100 has been placed on the panel until the stylus 100 is lifted up, an operation state request packet OD_UP is received in the second communication channel (or a discovery packet D_UP is received in the first communication channel), and the operation state transmission packet OD_DP continues to be transmitted.

<Hold Mode M4: Stylus 100>

If an operation state request packet OD_UP (or a discovery packet D_UP) is not received at step S1031, then the stylus 100 detects at step S1041 how many times (how long) an operation state request packet OD_UP (or a discovery packet D_UP) has not been received consecutively.

If an operation state request packet OD_UP (or a discovery packet D_UP) has not been received consecutively N or less number of times, then the stylus 100 determines that there remains the possibility that the user may resume use of the stylus 100, after a temporally removal from the panel, by lowering the stylus 100 onto the sensor panel to resume its communication with the sensor controller 200. Accordingly, within this period of time, while the continuous non-reception counter is successively incremented at step S1043, the second communication channel and the local identifier LID to be used for communication with the sensor controller 200 are maintained. In the hold mode M4, the stylus 100 uses the second communication channel designated in the communication setting table to continue to try to receive an operation state request packet OD_UP, and returns to the stroke mode M3 immediately if a new operation state request packet is received.

On the other hand, if a packet is not received from the sensor controller 200 for a number of times that exceeds N times at step S945, then the stylus 100 determines that use of the stylus 100 is ceased, and releases the second communication channel and the local identifier LID set in the communication setting table. The stylus 100 returns to the discovery mode M1, in which the first communication channel is utilized.

Operation Example 1: Where the First Stylus 101 Repeats Moving into and Out of the Detection Range FIG. 11 is a view illustrating operation of the position inputting system 1 when the first stylus 101 repeats moving into and out of the detection range of the sensor controller 200.

Figure 11:
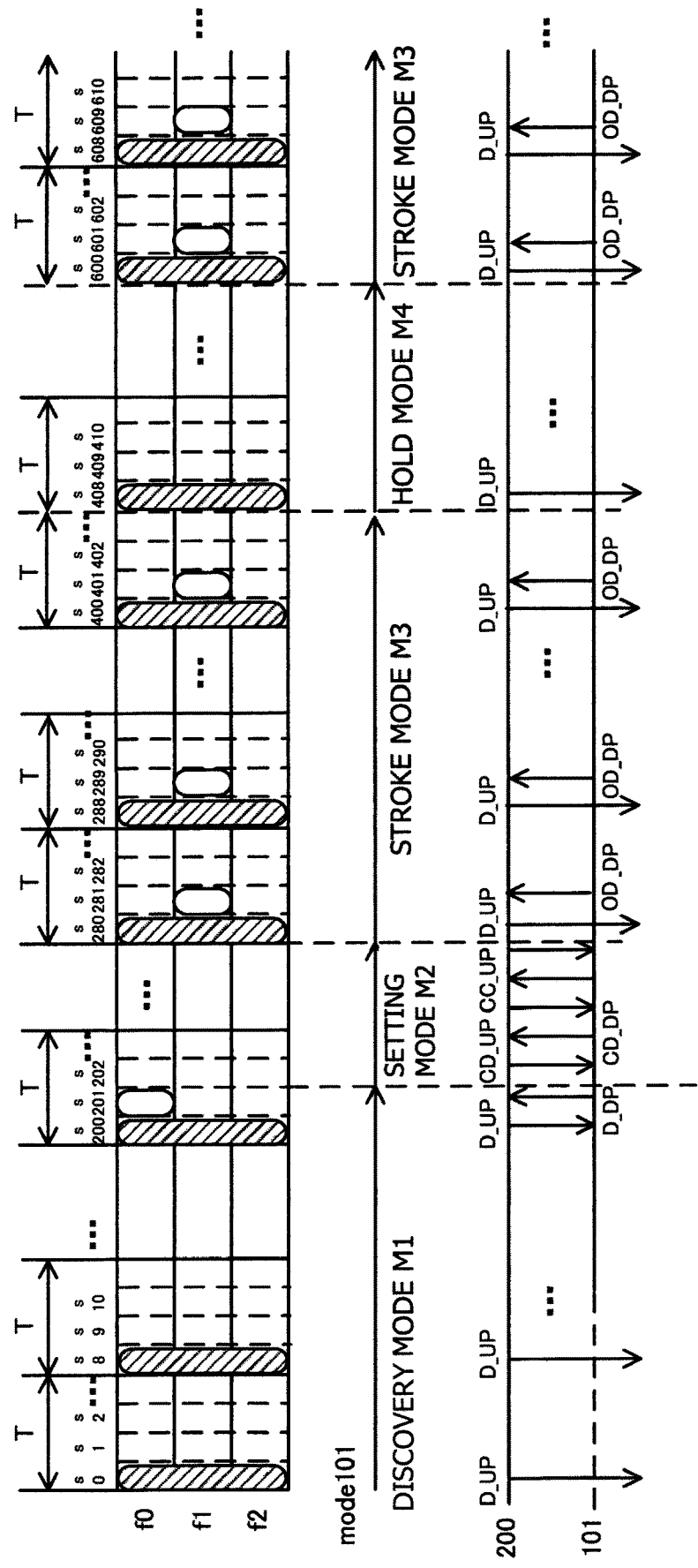
FIG. 11 is a view illustrating an example of operation, in which a first stylus repeats moving into and out of a detection range of the sensor controller.

The three rows in the upper portion of FIG. 11 (f0, f1, f2) indicate frequencies f of the communication channels to be utilized. Reference characters s0 to s610 in the horizontal direction denote time slots s.

Similarly as in FIGS. 7A to 7D, a communication channel indicated by slanted lines indicates a default communication channel (first communication channel) to be used to transmit a discovery packet D_UP or the like from the sensor controller 200 to an unspecified stylus 100. A communication channel indicated as a white frame (white circle) indicates a communication channel (second communication channel) used by the first stylus 101 to transmit operation state data OD in the stroke mode M3. The axis of abscissa denoted by "mode 101" indicates operation modes in communication between the first stylus 101 and the sensor controller 200. The bottom portion in FIG. 11 indicates a packet sequence between the first stylus 101 and the sensor controller 200.

The discovery mode M1 is executed from the time slot s0 through the time slot s201.

While the discovery mode M1 is executed, the sensor controller 200 continues to send out a discovery packet D_UP using the first communication channel, indicated by slanted lines, in a predetermined period (e.g., every eight time slots s, such as time slots s0, s8, s200, and s8$n$ ($n$ is 0 or a positive integer)).

When the first stylus 101 moves closer to the sensor controller 200 and returns a discovery response packet D_DP in the time slot s201, then the operation of the position inputting system 1 formed of the first stylus 101 and the sensor controller 200 transitions from the discovery mode M1 to the setting mode M2.

Within a period from the time slot s208 to the time slot s279, the setting mode M2 is executed.

During the setting mode M2 for the first (initial) time, the first stylus 101 sends out a configuration information transmission packet CD_DP including configuration data CD, which does not vary in response to an operation state of the first stylus 101, such as a stylus identifier SID of 48 bits or 64 bits. Meanwhile, the sensor controller 200 transmits a configuration information request packet CD_UP including the local identifier LID assigned to the first stylus 101 and a channel change request packet CC_UP including channel data CHD indicative of the second communication channel.

The time from the time slot s280 to the time slot s407 is a time period within which the user slidingly moves the first stylus 101 on the panel. During the sliding movement, the stroke mode M3 is executed as the operation mode of the position inputting system 1 formed of the first stylus 101 and the sensor controller 200.

In the example of FIG. 11, the operation state data OD, which varies depending upon an operation state of the first stylus 101 such as the pen pressure F and ON-OFF states of the buttons, is transmitted repeatedly in the second communication channel. The second communication channel may be defined, for example, by the set of the time slots s8$n$+1, which are subsequent to the time slots s8$n$ in which the discovery packet D_UP is received from the sensor controller 200, and the frequency f1.

Within the period from the time slot s408 to the time slot s599 preceding the time slot s600, the hold mode M4 is executed.

While the sensor controller 200 waits to receive an operation state transmission packet OD_DP in the second communication channel, if the first stylus 101 is removed from the panel and cannot detect (communicate with) the sensor controller 200, the sensor controller 200 does not receive an operation state transmission packet OD_DP.

Starting at the time slot s600, if the first stylus 101 is again detected in the time slot s601 (or in the time slot s600), the stroke mode M3 is again executed as the operation mode of the position inputting system 1. The first stylus 101 again transmits to the sensor controller 200 operation state data OD in an operation state transmission packet OD_DP, which includes the local identifier LID, in the second communication channel defined by the set of the frequency f1 and the time slots s8n+1. As described above, the local identifier LID need not be included in the operation state transmission packet OD_DP in some embodiments.

The sensor controller 200 identifies a stylus, from which operation state data OD is transmitted, based on the communication channel allocated to the first stylus 101 (or the local identifier LID associated with the communication channel). Therefore, the first stylus 101 can omit sending the stylus identifier SID during the stroke mode M3.

In exemplary embodiments, the sensor controller 200 is configured to acquire the stylus identifier SID of the stylus 101 in the setting mode M2 and to manage the acquired stylus identifier SID in association with the communication channel assigned to the stylus 101 in the communication resource table CRTbl. Therefore, even if the stylus identifier SID is not supplied in each of subsequent communication instances, the sensor controller 200 can output the received operation state data OD in association with the stylus identifier SID.

In the hold mode M4, the sensor controller 200 waits (stands by) for a defined period of time, following the stroke mode M3, while maintaining the communication resource and the local identifier LID for the stylus 100. Therefore, when the stylus 100 repeats moving into and out of the detection range of the sensor controller 200, the number of times the stylus identifier SID needs to be sent or the number of bits needed to send the stylus identifier SID can be reduced.

Operation Example 2: Where a Plurality of Styluses 100 are Alternately Used

Figure 12:
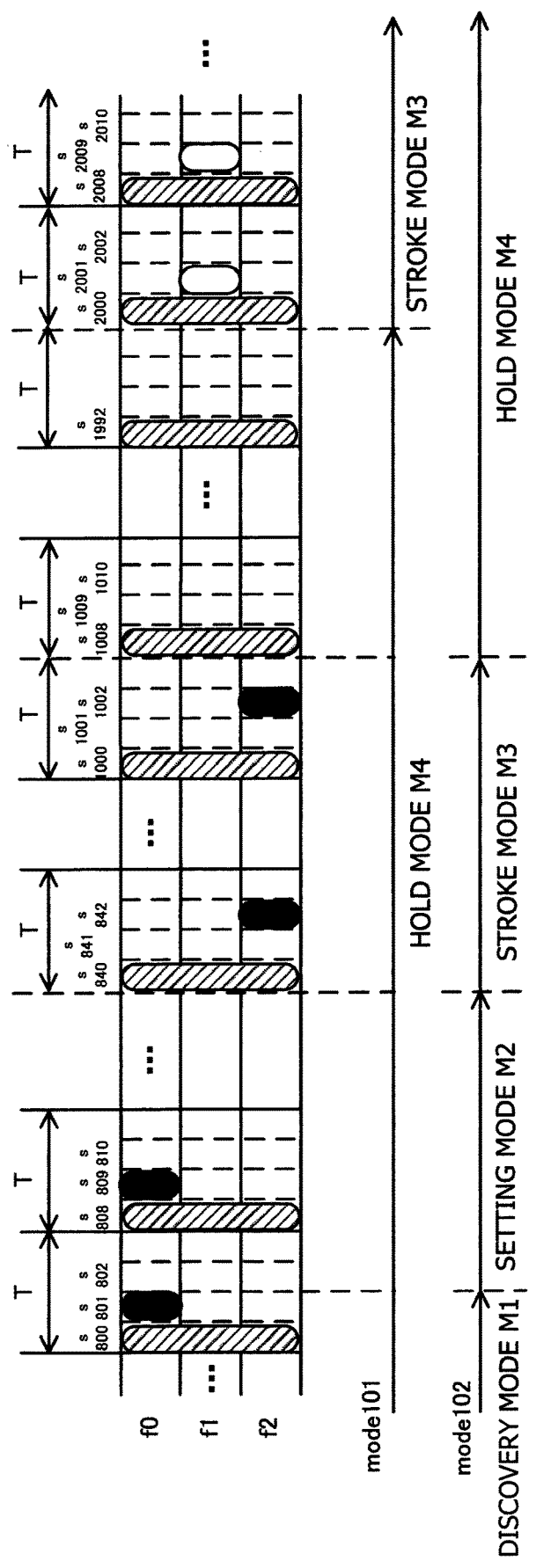
FIG. 12 is a view illustrating another example of operation, in which the first stylus and a second stylus are alternately used.

FIG. 12 is a view depicting operation of the position inputting system 1 when the first stylus 101 and the second stylus 102 alternately move into and out of the detection range of the sensor controller 200. Description of elements similar to those of FIG. 11 are omitted to avoid redundancy.

A communication channel indicated as a black frame (or black circle) in FIG. 12 indicates a communication channel (second communication channel) used for packet transmission from the second stylus 102. The axis of abscissa indicated by "mode 102" indicates an operation modes of the position inputting system formed of the second stylus 102 and the controller 200.

During the period from the time slot s800 until the time slot s2001, the user, for example, sets aside the first stylus 101 that the user has previously used, and instead uses the second stylus 102 in place of the first stylus 101. Within this time period, the position inputting system formed of the first stylus 101 and the sensor controller 200 operates in the hold mode M4.

The time slot s801 is a timing at which, for example, the user lowers the second stylus 102 to the panel. In the time slot s801, the second stylus 102 sends a reply to a discovery packet D_UP transmitted in a defined period from the sensor controller 200 using a default communication channel (communication channel of the frequency f0).

During the time period from the time slot s808 to the time slot s839, the second stylus 102 and the sensor controller 200 exchange configuration data CD in the setting mode M2. The sensor controller 200 refers to the communication resource table CRTbl to determine that the first stylus 101 is in the hold mode M4, that the local identifier LID assigned to the first stylus 101 is 0b001, and that the second communication channel assigned to the first stylus 101 is the communication channel defined by the time slot s8n+1 and the frequency f1. Then, the sensor controller 200 allocates to the second stylus 102 a local identifier LID (e.g., 0b0101) and a second communication channel (e.g., the time slot s8n+2 and the frequency f2), which are different from the resources allocated to the first stylus 101, and notifies the allocated local identifier LID and the second communication channel to the second stylus 102. In the communication resource table CRTbl, an entry for the second stylus 102 is generated and stored.

During the time slots from the time slot s840 to the time slot s1007, the second stylus 102 and the sensor controller 200 operate in the stroke mode M3. During this time period, the communication resource (second communication channel) for the first stylus 101 is maintained to support (possible) subsequent return of the first stylus 101 onto the sensor panel.

In the time slot s1008, if the second stylus 102 is, for example, removed from the sensor panel and thus becomes unable to communicate in the second communication channel, then the second stylus 102 and the sensor controller 200 transitions to the hold mode M4. The communication resources which utilize the frequency f2 (as assigned to the second stylus 102) are maintained in the communication resource table CRTbl.

In the time period starting from the time slot s2000, the first stylus 101 has returned from the hold mode M4 to the stroke mode M3. Since the communication channel of the frequency f1 has been maintained, the first stylus 101 need not perform operation of the discovery mode M1 or the setting mode M2. Therefore, the first stylus 101 may resume its operation in the stroke mode M3 quickly, without having to transmit its stylus identifier SID represented by a large number of bits such as 48 bits or 64 bits.

Thus, even when a plurality of styluses 100 are alternately used on the sensor panel, the number of times the stylus identifier SID needs to be transmitted from each of the styluses 100 can be reduced and the processing sequence required to set up the communication resource for each of the styluses 100 can be omitted.

As described above, with the method of the present invention, the sensor controller 200 can identify the first stylus 101 based on the first time slot, which is designated (assigned) by the channel change request packet CC_UP. Accordingly, even if a stylus identifier SID is not attached to operation state data OD, the sensor controller 200 can recognize that the operation state data OD has been transmitted from the first stylus 101 (based on the fact that the operation state data OD is received in the first time slot). Accordingly, the first stylus 101 can omit transmission of the stylus identifier SID when it transmits operation state data OD.

Further, with the method according to the present embodiment, the sensor controller 200 can acquire a stylus identifier SID from the first stylus 101 and thereafter manage the acquired stylus identifier SID in association with the communication channel used to communicate with the first stylus 101 in the communication resource table CRTbl. Accordingly, even if the stylus identifier SID is not added to operation state data OD, the sensor controller 200 can output the received operation state data OD in association with the stylus identifier SID of the first stylus 101 to the electronic apparatus controlling unit 300.

Furthermore, with the method according to the present embodiment, subsequent to the stroke mode M3 in which a stylus 100 and the sensor controller 200 successively communicate operation state data OD, the hold mode M4 is provided in which they both stand by for a defined period of time while maintaining the assigned communication resource and the local identifier LID. Accordingly, when the first stylus 101 repeatedly moves into and out of the detection rage of the sensor controller 200 or when the first stylus 101 and the second stylus 102 are alternately used, the stroke mode M3 can be quickly restored to resume communication of operation state data OD without requiring the processing in the setting mode M2 or the like. As a result, the number of times a stylus identifier SID needs to be sent out can be reduced.

The present invention is not limited to the embodiments described above and can be carried out in various forms without departing from the scope of the present disclosure.

For example, the sensor controller 200 in the embodiment described above retains a stylus identifier SID (of the stylus 100) in the communication resource table CRTbl until the second communication channel and the local identifier LID assigned to the stylus 100 are released at step S949 depicted in FIG. 9. However, the sensor controller 200 may delete the stylus identifier SID from the communication resource table CRTb1 upon expiration of a defined period of time after the sensor controller 200 stops receiving an operation state transmission packet OD_DP from the stylus 100. In the following, this modification is described in detail with reference to FIG. 13.

Figure 13:
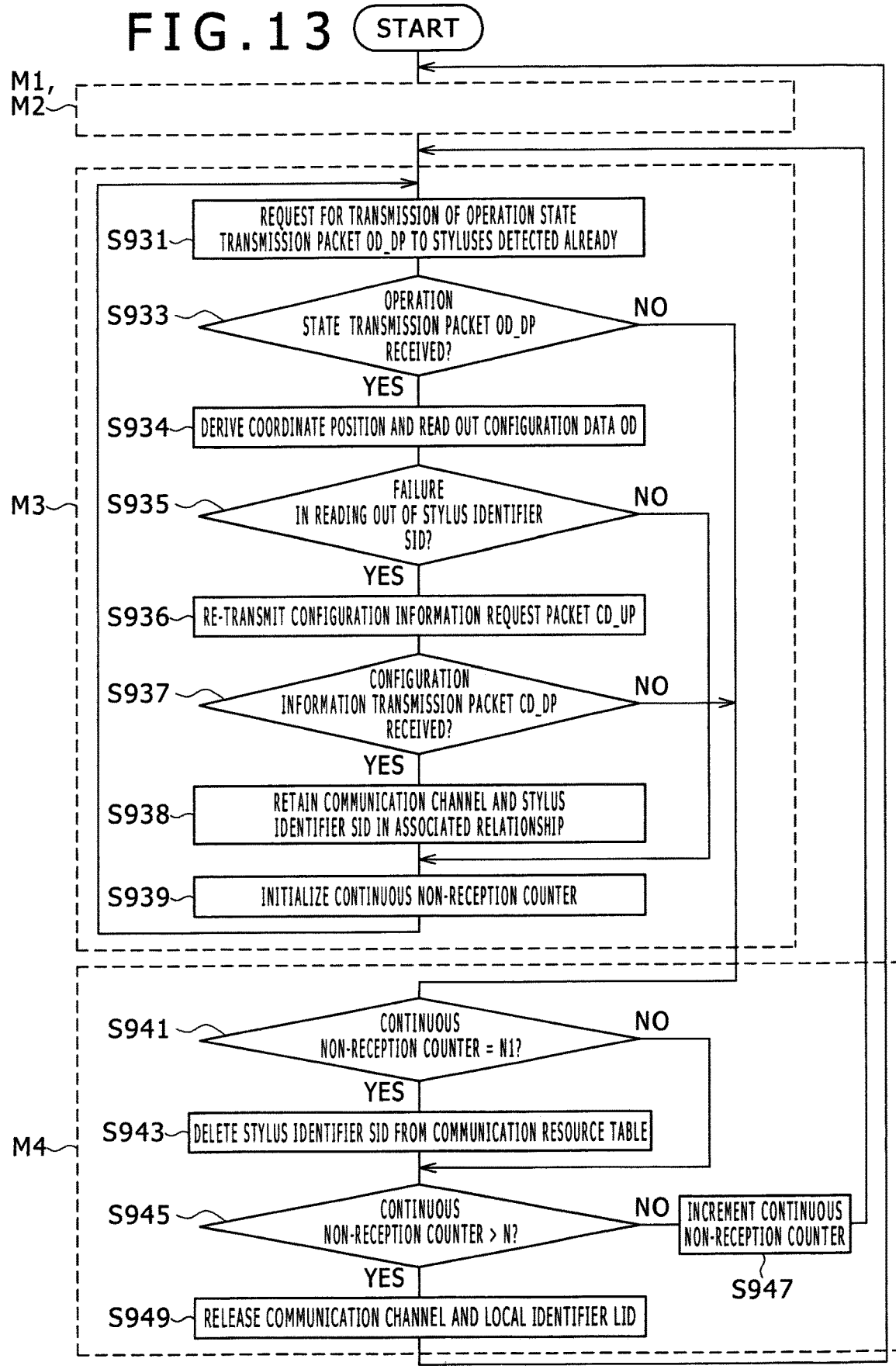
FIG. 13 is a modification to the operation flow diagram of the sensor controller, particularly, of the stylus detection unit.

FIG. 13 depicts a modification to the operation flow chart of the sensor controller 200 (stylus detection unit 215). The present modification is different from the example depicted in FIG. 9 in regard to processing in the stroke mode M3 and the hold mode M4, and though not depicted in FIG. 13, processing in the discovery mode M1 and the setting mode M2 is the same as that in the example of FIG. 9. In the following, description is given primarily of differences between the present modification and the example of FIG. 9.

The sensor controller 200 in the present modification determines, when an operation state transmission packet OD_DP is not received at step S933, whether or not the consecutive non-reception counter is equal to a constant value N1 (step S941). The constant value N1 is a number smaller than the constant value N used in the decision at step S945. If the sensor controller 200 determines at step S941 that the consecutive non-reception counter is not equal to the constant value N, then it advances to step S945 and performs processing similar to that in the example of FIG. 9. On the other hand, if the sensor controller 200 determines that the consecutive non-reception counter is equal to the constant value N, then it deletes the stylus identifier SID from the relevant record entry in the communication resource table CRTbl (step S943). Thereafter, the processing advances to step S945, and the sensor controller performs processing similar to that in the example of FIG. 9. According this modification, upon expiration of a defined period of time after it is detected that an operation state transmission packet OD_DP is not received, the stylus identifier SID is deleted from the communication resource table CRTbl.

In step S934 in the stroke mode M3, the sensor controller 200 attempts to read out configuration data CD including the stylus identifier SID from the communication resource table CRTbl and, in step S935, determines whether it has failed in reading out the stylus identifier SID. If the stylus identifier SID has been deleted from the relevant record in the communication resource table CRTbl at step S943, then the decision result at step S935 would be YES. If the sensor controller 200 determines at step S935 that it has not failed to read out the stylus identifier SID, then it supplies the coordinate position derived at step S934 and the stylus identifier SID read out from the communication resource table CRTbl in an associated relationship with each other to the electronic apparatus controlling unit 300 (not depicted). Thereafter, the sensor controller 200 advances to step S939 and performs subsequent processing similar to that of the example in FIG. 9. On the other hand, if the sensor controller 200 determines that it has failed to read out the stylus identifier SID at step s935, then in step S936 it re-sends the configuration information request packet CD_UP, which has been transmitted at step S921 of FIG. 9. Then, the sensor controller 200 determines whether a configuration information transmission packet CD_DP is received in response from the stylus 100 (step S937). If the sensor controller 200 determines that a configuration information transmission packet CD_DP is received (YES at S937), then it extracts configuration data CD such as a stylus identifier SID from the received configuration information transmission packet CD_DP and registers the configuration data CD in the corresponding record in the communication resource table CRTbl (step S937). As a result, the communication resource and the stylus identifier SID are again stored in an associated relationship with each other in the sensor controller 200. Thereafter, the sensor controller 200 supplies the coordinate position derived at step S934 and the stylus identifier SID newly registered in the communication resource table CRTbl in an associated relationship with each other to the electronic apparatus controlling unit 300 (not depicted). Thereafter, the sensor controller 200 advances to step S939, and performs subsequent processing similar to that of the example in FIG. 9. If the sensor controller 200 determines that a configuration information transmission packet CD_DP is not received at step S937, the processing advances to step S941, and performs subsequent processing similar to that of the example in FIG. 9.

As described above, with the sensor controller 200 according to the present modification, when a fixed period of time elapses after it is detected that an operation state transmission packet OD_DP is not received, the stylus identifier SID is deleted from the communication resource table CRTbl. Therefore, a portion of the storage area of the sensor controller 200 occupied by the communication resource table CRTbl can be released at an earlier timing than that in the previous embodiments. Further, if the stylus identifier SID is required again, then the stylus identifier SID can be received again from the stylus 100. Therefore, the sensor controller 200 according to the present modification also can readily perform supply of data (coordinate position and stylus identifier SID) to the electronic apparatus controlling unit 300.

The invention claimed is:
1. An active stylus, comprising:
a reception circuit configured to detect a control signal transmitted from a sensor panel;
a transmission circuit configured to transmit a stylus signal to the sensor panel; and
an integrated circuit configured to selectively enter different operation modes including:
a first mode in which detection of the control signal is repeatedly attempted;
a second mode in which, after the control signal is detected, a communication setting for transmitting the stylus signal is configured and the stylus signal is transmitted according to the communication setting; and
a third mode in which, after the control signal ceases to be detected, the communication setting is maintained for a defined period of time.

2. The active stylus of claim 1, wherein, in the third mode, the stylus signal is repeatedly transmitted according to the maintained communication setting.

3. The active stylus of claim 1, wherein, in the second mode, the stylus signal is repeatedly transmitted according to the communication setting as long as the active stylus traverses over a surface of the sensor panel.

4. The active stylus of claim 1, wherein,
the communication setting includes a local ID (LID) allocated to the active stylus, and
the LID is released after the defined period of time in response to not detecting the control signal for the defined period of time.

5. The active stylus of claim 1, wherein,
the integrated circuit returns to the first mode from the third mode in response to not detecting the control signal for the defined period of time; and
the integrated circuit returns to the second mode from the third mode in response to detecting the control signal in the defined period of time.

6. The active stylus of claim 5, wherein the integrated circuit, in response to detecting the control signal in the defined period of time, returns to the second mode from the third mode while maintaining the communication setting.

7. A method implemented by an active stylus, comprising:
detecting a control signal transmitted from a sensor panel;
transmitting a stylus signal to the sensor panel; and
selectively entering different operation modes including:
a first mode in which detection of the control signal is repeatedly attempted;
a second mode in which, after the control signal is detected, a communication setting for transmitting the stylus signal is configured and the stylus signal is transmitted according to the communication setting; and
a third mode in which, after the control signal ceases to be detected, the communication setting is maintained for a defined period of time.

8. The method of claim 7, wherein, in the third mode, the stylus signal is repeatedly transmitted according to the maintained communication setting.

9. The method of claim 7, wherein, in the second mode, the stylus signal is repeatedly transmitted according to the communication setting as long as the active stylus traverses over a surface of the sensor panel.

10. The method of claim 7, wherein,
the communication setting includes a local ID (LID) allocated to the active stylus, and
the method includes releasing the LID after the defined period of time in response to not detecting the control signal for the defined period of time.

11. The method of claim 7, comprising:
returning to the first mode from the third mode in response to not detecting the control signal for the defined period of time; and
returning to the second mode from the third mode in response to detecting the control signal in the defined period of time.

12. The method of claim 11, comprising:
in response to detecting the control signal in the defined period of time, returning to the second mode from the third mode while maintaining the communication setting.

13. An integrated circuit configured to control operation of an active stylus, the integrated circuit comprising:
reception circuitry configured to detect a control signal transmitted from a sensor panel;
transmission circuitry configured to transmit, via an electrode of the active stylus, a stylus signal to the sensor panel; and
processing circuitry configured to selectively enter different operation modes of the active stylus including:
a first mode in which detection of the control signal from the sensor panel is repeatedly attempted;
a second mode in which, after the control signal is detected, a communication setting for transmitting the stylus signal is configured and the stylus signal is transmitted from the active stylus according to the communication setting; and
a third mode in which, after the control signal ceases to be detected, the communication setting is maintained for a defined period of time.

14. The integrated circuit of claim 13, wherein, in the third mode, the stylus signal is repeatedly transmitted according to the maintained communication setting.

15. The integrated circuit of claim 13, wherein, in the second mode, the stylus signal is repeatedly transmitted according to the communication setting as long as the active stylus traverses over a surface of the sensor panel.

16. The integrated circuit of claim 13, wherein,
the communication setting includes a local ID (LID) allocated to the active stylus, and
the processing circuitry releases the LID after the defined period of time in response to not detecting the control signal for the defined period of time.

17. The integrated circuit of claim 13, wherein,
the processing circuitry returns to the first mode from the third mode in response to not detecting the control signal for the defined period of time; and
the processing circuitry returns to the second mode from the third mode in response to detecting the control signal in the defined period of time.

18. The integrated circuit of claim 17, wherein the processing circuitry, in response to detecting the control signal in the defined period of time, returns to the second mode from the third mode while maintaining the communication setting.

* * * * *